(12) United States Patent
Feng et al.

(10) Patent No.: US 11,924,833 B2
(45) Date of Patent: Mar. 5, 2024

(54) TRANSMISSION FEEDBACK METHOD AND USER EQUIPMENT

(71) Applicant: DATANG MOBILE COMMUNICATIONS EQUIPMENT CO., LTD., Beijing (CN)

(72) Inventors: Yuan Feng, Beijing (CN); Fangchen Cheng, Beijing (CN); Rui Zhao, Beijing (CN); Shilei Zheng, Beijing (CN); Jinling Hu, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 428 days.

(21) Appl. No.: 17/290,359

(22) PCT Filed: Oct. 18, 2019

(86) PCT No.: PCT/CN2019/111842
§ 371 (c)(1),
(2) Date: Apr. 30, 2021

(87) PCT Pub. No.: WO2020/088267
PCT Pub. Date: May 7, 2020

(65) Prior Publication Data
US 2021/0321386 A1    Oct. 14, 2021

(30) Foreign Application Priority Data

Nov. 2, 2018    (CN) .......................... 201811303670.5

(51) Int. Cl.
*H04W 72/20*    (2023.01)
*H04L 1/1812*    (2023.01)
(Continued)

(52) U.S. Cl.
CPC .......... *H04W 72/20* (2023.01); *H04L 1/1812* (2013.01); *H04W 4/06* (2013.01); *H04W 76/10* (2018.02); *H04W 72/044* (2013.01)

(58) Field of Classification Search
None
See application file for complete search history.

(56) References Cited

U.S. PATENT DOCUMENTS

2018/0152274 A1    5/2018    Li et al.
2019/0123923 A1*   4/2019    Belleschi ................ H04W 4/40
(Continued)

FOREIGN PATENT DOCUMENTS

CN    107040995 A    8/2017
CN    108347313 A    7/2018
(Continued)

OTHER PUBLICATIONS

Chinese Office Action for CN Application No. 201811303670.5 dated Oct. 9, 2020.
(Continued)

*Primary Examiner* — Kenny S Lin
(74) *Attorney, Agent, or Firm* — Harness, Dickey & Pierce, P.L.C.

(57) ABSTRACT

The present disclosure provides a transmission feedback method and a UE. The transmission feedback method includes: transmitting a time-frequency transmission resource for transmitting feedback information for unicasting or multicasting transmission to at least one target UE which has established a connection with a source UE; acquiring the feedback information transmitted on the time-frequency transmission resource from the target UE; and determining a unicasting or multicasting transmission state in accordance with the feedback information.

20 Claims, 3 Drawing Sheets

(51) Int. Cl.
*H04W 4/06* (2009.01)
*H04W 76/10* (2018.01)
*H04W 72/044* (2023.01)

(56) References Cited

U.S. PATENT DOCUMENTS

| | | |
|---|---|---|
| 2019/0327724 A1 | 10/2019 | Zhao |
| 2019/0349895 A1* | 11/2019 | Liu ........................ H04L 5/0094 |
| 2019/0387383 A1* | 12/2019 | Ye ............................ H04W 4/80 |
| 2020/0059915 A1* | 2/2020 | Lee .................. H04W 56/0015 |
| 2020/0195389 A1* | 6/2020 | Basu Mallick ......... H04L 1/189 |
| 2020/0204329 A1* | 6/2020 | Fujishiro ............... H04L 1/1861 |
| 2020/0305176 A1* | 9/2020 | Hu ........................ H04L 1/1819 |
| 2020/0404684 A1* | 12/2020 | Lee ....................... H04L 1/1896 |

FOREIGN PATENT DOCUMENTS

| | | |
|---|---|---|
| EP | 3553985 A1 | 10/2019 |
| EP | 3554033 A1 | 10/2019 |
| EP | 3860275 A1 | 8/2021 |
| WO | WO-2017015836 A1 | 2/2017 |
| WO | WO-2018/133720 A1 | 7/2018 |
| WO | WO-2018/137452 A1 | 8/2018 |

OTHER PUBLICATIONS

Xiaomi Communications, "On support of HARQ for V2x communications", Agenda item 7.2.4.1.1, 3GPP TSG RAN WG1 Meeting #94bis, R1-1811420, Oct. 8-12, 2018, Chengdu, China.
Catt, "Discussion on physical layer procedures in NR V2X", Agenda item 7.2.4.1.2, 3GPP TSG RAN1 Meeting #95, R1-1812618, Nov. 12-16, 2018, Spokane, USA.
Written Opinion and International Search Report for International Application No. PCT/CN20109/111842 dated Apr. 27, 2021.
Extended European Search Report dated Nov. 24, 2021 for Application No. EP 19880565.7.
Catt, "Support of unicast, groupcast and broadcast in NR sidelink", Agenda Item 7.2.4.1.1, 3GPP TSG RAN1 Meeting #94bis, R1-1810539, Oct. 8-12, 2018, Chengdu, China.
Oppo, "Discussion of sidelink unicast, groupcast and broadcast for NR-V2X", Agenda Item 7.2.4.1.1, 3GPP TSG RAN WG1 Meeting #94bis, R1-1810984, Oct. 8-12, 2018, Chengdu, China.
NTT DOCOMO, Inc., "Support of unicast, groupcast and broadcast in sidelink", Agenda Item 7.2.4.1.1, 3GPP TSG RAN WG1 Meeting #94bis, R1-1811332, Oct. 8-12, 2018, Chengdu, China.

* cited by examiner

TRANSMISSION FEEDBACK METHOD AND USER EQUIPMENT

CROSS-REFERENCE TO RELATED APPLICATIONS

This present application is the U.S. national phase of PCT Application No. PCT/CN2019/111842 filed on Oct. 18, 2019, which claims priority to Chinese Application No. 201811303670.5 filed on Nov. 2, 2018, the entire contents of each of which are hereby incorporated by reference.

TECHNICAL FIELD

The present disclosure relates to the field of communication technology, in particular to a transmission feedback method and a User Equipment (UE).

BACKGROUND

Vehicle to everything (V2X) technology may sense in real time a surrounding environment about a vehicle, share road information and give a warning in time by means of wireless communication between vehicles, between the vehicle and road test infrastructure, and between the vehicle and passers-by, and thus it has currently become a research hotspot for dealing with road safety issues all over the world.

In a related Long Term Evolution (LTE) V2X technology (Rel-14 LTE V2X), a PC5 interface for transmitting data between UEs (also called as sidelink) has already been used to support the transmission of basic road safety-based services.

Along with the development of Internet of Vehicles (IoV) technology, some new application scenarios occur, e.g., vehicle platoon marshalling, advanced driving, information sharing among sensors, and remote control. In some of these applications, communication is required among the UEs in one group, or unicast communication is required between two UEs.

The introduction of feedback for unicasting and multicasting has not been discussed in R14/R15, i.e., a feedback signal also needs to be introduced apart from a Physical Sidelink Shared Channel (PSSCH) and a Physical Sidelink Control Channel (PSCCH). Whether the feedback signal is transmitted through a specifically-defined feedback resource or through the PSCCH and/or PSSCH is currently being discussed. In addition, whether the feedback resource is indicated by a source UE or a target UE is also currently being discussed, and there is no definite scheme about how to indicate the feedback resource.

SUMMARY

An object of the present disclosure is to provide a transmission feedback method and a UE, so as to solve the problem in the related art where no feedback resource is introduced for the unicasting and multicasting transmission and there is no definite scheme about how to transmit and indicate the feedback resource.

In one aspect, the present disclosure provides in some embodiments a transmission feedback method, including: transmitting a time-frequency transmission resource for transmitting feedback information for unicasting or multicasting transmission to at least one target UE which has established a connection with a source UE; acquiring the feedback information transmitted on the time-frequency transmission resource from the target UE; and determining a unicasting or multicasting transmission state in accordance with the feedback information.

In a possible embodiment of the present disclosure, the time-frequency transmission resource at least includes a PSSCH, a PSCCH, and a Hybrid Automatic Repeat Request-Acknowledgement (HARQ-ACK) feedback channel, and Sidelink Control Information (SCI) is carried in the PSCCH and indicates position information about the HARQ-ACK feedback channel.

In a possible embodiment of the present disclosure, the transmitting the time-frequency transmission resource for transmitting the feedback information for unicasting or multicasting transmission to the at least one target UE which has established the connection with the source UE includes: establishing the connection with the at least one target UE; and autonomously selecting a time-frequency transmission resource or receiving a time-frequency transmission resource allocated by a network side device, and transmitting the time-frequency transmission resource to the target UE.

In a possible embodiment of the present disclosure, the establishing the connection with the at least one target UE includes: in a unicasting communication mode, establishing, by the source UE, the connection with one target UE; and in a connection establishment process, negotiating or interacting, by the source UE, with the target UE to determine a source Identity (ID) and a target ID.

In a possible embodiment of the present disclosure, the establishing the connection with the at least one target UE includes: in a multicasting communication mode, establishing, by the source UE, the connection with at least two target UEs; and in a connection establishment process, negotiating or interacting, by the source UE, with the at least two target UEs to determine a target group ID and identification information about the source UE and the at least two target UEs.

In a possible embodiment of the present disclosure, the autonomously selecting the time-frequency transmission resource or receiving the time-frequency transmission resource allocated by the network side device and transmitting the time-frequency transmission resource to the target UE includes: autonomously selecting, by the source UE, a time-frequency transmission resource from a resource pool, and transmitting the selected time-frequency transmission resource to the target UE; or after the network side device has allocated a time-frequency transmission resource in accordance with a service delay requirement of the source UE and a processing capability of the target UE, receiving the time-frequency transmission resource from the network side device and transmitting the time-frequency transmission resource to the target UE.

In a possible embodiment of the present disclosure, the SCI carried in the time-frequency transmission resource includes a target ID indicator and an offset indicator; or the SCI includes the target ID indicator, and a source ID indicator or a session ID/sequence ID indicator; or when the source UE has negotiated or interacted with the target UE in the connection establishment process to determine an offset value, the SCI includes the target ID indicator, and the source ID indicator or the session ID/sequence ID indicator.

In a possible embodiment of the present disclosure, the acquiring the feedback information transmitted on the time-frequency transmission resource from the target UE includes: acquiring a first sequence in accordance with the SCI; and performing sliding-related peak detection on the HARQ-ACK feedback channel for the time-frequency transmission resource in accordance with sequence correlation, and acquiring the feedback information.

In a possible embodiment of the present disclosure, the acquiring the first sequence in accordance with the SCI includes: when the SCI includes the source ID indicator, acquiring the first sequence generated by the target UE in accordance with a system mapping and the source ID; or when the SCI includes the target ID indicator, acquiring the first sequence generated by the target UE in accordance with the target ID and an offset value, the offset value being indicated in the SCI or determined by the source UE and the target UE through negotiation or interaction in the connection establishment process; or when the SCI includes the session ID/sequence ID indicator, acquiring the first sequence generated by the target UE in accordance with the system mapping and a session ID/sequence ID.

In a possible embodiment of the present disclosure, the acquiring the feedback information transmitted on the time-frequency transmission resource from the target UE includes: acquiring a second sequence generated by the target UE in accordance with the target group ID; and performing sliding-related peak detection on the HARQ-ACK feedback channel for the time-frequency transmission resource in accordance with sequence correlation, and acquiring the feedback information.

In a possible embodiment of the present disclosure, the acquiring the feedback information transmitted on the time-frequency transmission resource from the target UE includes: acquiring a third sequence generated by the at least one target UE in accordance with the target group ID and corresponding identification information; and performing sliding-related peak detection on the HARQ-ACK feedback channel for the time-frequency transmission resource in accordance with the sequence correlation, and when Negative Acknowledge (NACK) information has been detected in accordance with the third sequence, stopping the detection and acquiring the feedback information. Different pieces of identification information about the target UEs correspond to different offset values.

In a possible embodiment of the present disclosure, the determining the unicasting or multicasting transmission state in accordance with the feedback information includes: upon the receipt of ACK information from the target UE, determining that the unicasting transmission has been performed successfully between the source UE and the target UE; and upon the receipt of the NACK information from the target UE, determining that the multicasting transmission has been performed unsuccessfully between the source UE and the target UE. The feedback information is transmitted by the target UE in the unicasting communication mode merely when reception has been performed successfully, and the feedback information is transmitted by the target UE in the multicasting communication mode merely when the reception has been performed unsuccessfully.

In a possible embodiment of the present disclosure, when the unicasting or multicasting transmission has been performed unsuccessfully between the source UE and the target UE, the transmission feedback method further includes initiating a retransmission process, and transmitting the reacquired time-frequency transmission resource to the target UE.

In another aspect, the present disclosure provides in some embodiments a transmission feedback method, including: receiving time-frequency transmission resource for transmitting feedback information for unicasting or multicasting transmission from a source UE; and transmitting, by a target UE, the feedback information on the time-frequency transmission resource.

In a possible embodiment of the present disclosure, the time-frequency transmission resource at least includes a PSSCH, a PSCCH, and an HARQ-ACK, and SCI is carried in the PSCCH and indicates position information about the HARQ-ACK feedback channel.

In a possible embodiment of the present disclosure, the receiving the time-frequency transmission resource for transmitting the feedback information for the unicasting or multicasting transmission from the source UE includes: establishing a connection with the source UE; and receiving the time-frequency transmission resource from the source UE.

In a possible embodiment of the present disclosure, the transmitting, by the target UE, the feedback information on the time-frequency transmission resource includes: performing blind detection on the PSCCH to acquire position information about the PSCCH, the PSSCH and the HARQ-ACK feedback channel; after the position information about the PSSCH has been acquired, parsing the PSSCH to acquire a unicasting or multicasting transmission state, and determining the feedback information in accordance with the unicasting or multicasting transmission state; and transmitting the feedback information to the source UE through the HARQ-ACK feedback channel.

In a possible embodiment of the present disclosure, in a unicasting communication mode, the SCI includes a target ID indicator and an offset indicator; or in the unicasting communication mode, the SCI includes the target ID indicator, and a source ID indicator or a session ID/sequence ID indicator, and the source ID and the target ID are determined by the target UE and the source UE through negotiation or interaction in a connection establishment process; or in the unicasting communication mode, when the source ID, the target ID and an offset value are determined by the target UE and the source UE through negotiation or interaction in the connection establishment process, the SCI includes the target ID indicator, and the source ID or the session ID/sequence ID indicator.

In a possible embodiment of the present disclosure, the determining the feedback information in accordance with the unicasting or multicasting transmission state includes generating, by the target UE, a first sequence carrying ACK information in accordance with the SCI when the unicasting transmission has been performed successfully between the target UE and the source UE.

In a possible embodiment of the present disclosure, the generating, by the target UE, the first sequence carrying the ACK information in accordance with the SCI includes: when the SCI includes the source ID indicator, generating, by the target UE, the first sequence in accordance with a system mapping and the source ID; or when the SCI includes the target ID indicator, generating, by the target UE, the first sequence in accordance with the target ID and the offset value; or when the SCI includes the session ID/sequence ID indicator, generating, by the target UE, the first sequence in accordance with the system mapping and a session ID/sequence ID.

In a possible embodiment of the present disclosure, the transmitting the feedback information to the source UE through the HARQ-ACK feedback channel includes transmitting the first sequence carrying the ACK information to the source UE through the HARQ-ACK feedback channel, and the feedback information is transmitted by the target UE in the unicasting communication mode merely when reception has been performed successfully.

In a possible embodiment of the present disclosure, the determining the feedback information in accordance with the unicasting or multicasting transmission state includes, when the multicasting transmission has been performed unsuccessfully between the target UE and the source UE, generating, by the target UE which has performed reception unsuccessfully, a second sequence carrying NACK information in accordance with a target group ID, and the target group ID is determined by at least two target UEs and the source UE through negotiation or interaction in a multicasting connection establishment process.

In a possible embodiment of the present disclosure, the determining the feedback information in accordance with the unicasting or multicasting transmission state includes, when the multicasting transmission has been performed unsuccessfully between the target UE and the source UE, generating, by the target UE which has performed the reception unsuccessfully, a third sequence carrying NACK information in accordance with the target group ID and corresponding identification information. The target group ID and the identification information about the source UE and the target UEs are determined by the at least two target UEs and the source UE through negotiation or interaction in the connection establishment process, and different pieces of identification information about the target UEs correspond to different offset values.

In a possible embodiment of the present disclosure, the transmitting the feedback information to the source UE through the HARQ-ACK feedback channel includes transmitting the second sequence carrying the NACK information to the source UE through the HARQ-ACK feedback channel, and the feedback information is transmitted by the target UE in the multicasting communication mode merely when the reception has been performed unsuccessfully.

In a possible embodiment of the present disclosure, the transmitting the feedback information to the source UE through the HARQ-ACK feedback channel includes transmitting, by the target UE, the third sequence carrying the NACK information to the source UE through the HARQ-ACK feedback channel, and the feedback information is transmitted by the target UE in the multicasting communication mode merely when the reception has been performed unsuccessfully.

In a possible embodiment of the present disclosure, subsequent to transmitting, by the target UE, the feedback information on the time-frequency transmission resource, when the unicasting or multicasting transmission is performed unsuccessfully between the source UE and the target UE, the transmission feedback method further includes determining that a retransmission process is to be initiated, and receiving the reacquired time-frequency transmission resource from the source UE.

In yet another aspect, the present disclosure provides in some embodiments a source UE, including a transceiver, a memory, a processor, and a computer program stored in the memory and executed by the processor. The transceiver is configured to execute the computer program, so as to transmit time-frequency transmission resource for transmitting feedback information for unicasting or multicasting transmission to at least one target UE which has established a connection with the source UE. The processor is configured to: acquire the feedback information transmitted on the time-frequency transmission resource from the target UE; and determine a unicasting or multicasting transmission state in accordance with the feedback information.

In a possible embodiment of the present disclosure, the time-frequency transmission resource at least includes a PSSCH, a PSCCH, and an HARQ-ACK feedback channel, and SCI is carried in the PSCCH and indicates position information about the HARQ-ACK feedback channel.

In a possible embodiment of the present disclosure, when transmitting the time-frequency transmission resource for transmitting the feedback information for unicasting or multicasting transmission to the at least one target UE which has established the connection with the source UE, the transceiver is further configured to: establish the connection with the at least one target UE; and autonomously select a time-frequency transmission resource or receive a time-frequency transmission resource allocated by a network side device, and transmit the time-frequency transmission resource to the target UE.

In a possible embodiment of the present disclosure, when establishing the connection with the at least one target UE, the transceiver is further configured to: in a unicasting communication mode, establish the connection with one target UE; and in a connection establishment process, negotiate or interact with the target UE to determine a source ID and a target ID.

In a possible embodiment of the present disclosure, when establishing the connection with the at least one target UE, the transceiver is further configured to: in a multicasting communication mode, establish the connection with at least two target UEs; and in a connection establishment process, negotiate or interact with the at least two target UEs to determine a target group ID and identification information about the source UE and the at least two target UEs.

In a possible embodiment of the present disclosure, when autonomously selecting the time-frequency transmission resource or receiving the time-frequency transmission resource allocated by the network side device and transmitting the time-frequency transmission resource to the target UE, the transceiver is further configured to: autonomously select a time-frequency transmission resource from a resource pool, and transmit the selected time-frequency transmission resource to the target UE; or after the network side device has allocated a time-frequency transmission resource in accordance with a service delay requirement of the source UE and a processing capability of the target UE, receive the time-frequency transmission resource from the network side device and transmit the time-frequency transmission resource to the target UE.

In a possible embodiment of the present disclosure, the SCI carried in the time-frequency transmission resource includes a target ID indicator and an offset indicator; or the SCI includes the target ID indicator, and a source ID indicator or a session ID/sequence ID indicator; or when the source UE has negotiated or interacted with the target UE in the connection establishment process to determine an offset value, the SCI includes the target ID indicator, and the source ID indicator or the session ID/sequence ID indicator.

In a possible embodiment of the present disclosure, when acquiring the feedback information transmitted on the time-frequency transmission resource from the target UE, the processor is further configured to: acquire a first sequence in accordance with the SCI; and perform sliding-related peak detection on the HARQ-ACK feedback channel for the time-frequency transmission resource in accordance with sequence correlation, and acquire the feedback information.

In a possible embodiment of the present disclosure, when acquiring the first sequence in accordance with the SCI, the processor is further configured to: when the SCI includes the source ID indicator, acquire the first sequence generated by the target UE in accordance with a system mapping and the source ID; or when the SCI includes the target ID indicator, acquire the first sequence generated by the target UE in accordance with the target ID and an offset value, the offset value being indicated in the SCI or determined by the source UE and the target UE through negotiation or interaction in the connection establishment process; or when the SCI includes the session ID/sequence ID indicator, acquire the first sequence generated by the target UE in accordance with the system mapping and a session ID/sequence ID.

In a possible embodiment of the present disclosure, when acquiring the feedback information transmitted on the time-frequency transmission resource from the target UE, the processor is further configured to: acquire a second sequence generated by the target UE in accordance with the target group ID; and perform sliding-related peak detection on the HARQ-ACK feedback channel for the time-frequency transmission resource in accordance with sequence correlation, and acquire the feedback information.

In a possible embodiment of the present disclosure, when acquiring the feedback information transmitted on the time-frequency transmission resource from the target UE, the processor is further configured to: acquire a third sequence generated by the at least one target UE in accordance with the target group ID and corresponding identification information; and perform sliding-related peak detection on the HARQ-ACK feedback channel for the time-frequency transmission resource in accordance with the sequence correlation, and when NACK information has been detected in accordance with the third sequence, stop the detection and acquire the feedback information. Different pieces of identification information about the target UEs correspond to different offset values.

In a possible embodiment of the present disclosure, when determining the unicasting or multicasting transmission state in accordance with the feedback information, the processor is further configured to: upon the receipt of ACK information from the target UE, determine that the unicasting transmission has been performed successfully between the source UE and the target UE; and upon the receipt of the NACK information from the target UE, determine that the multicasting transmission has been performed unsuccessfully between the source UE and the target UE. The feedback information is transmitted by the target UE in the unicasting communication mode merely when reception has been performed successfully, and the feedback information is transmitted by the target UE in the multicasting communication mode merely when the reception has been performed unsuccessfully.

In a possible embodiment of the present disclosure, when the unicasting or multicasting transmission has been performed unsuccessfully between the source UE and the target UE, the transceiver is further configured to initiate a retransmission process, and transmit the reacquired time-frequency transmission resource to the target UE.

In still yet another aspect, the present disclosure provides in some embodiments a target UE, including a transceiver, a memory, a processor, and a computer program stored in the memory and executed by the processor. The transceiver is configured to execute the computer program, so as to: receive a time-frequency transmission resource for transmitting feedback information for unicasting or multicasting transmission from a source UE; and transmit the feedback information on the time-frequency transmission resource.

In a possible embodiment of the present disclosure, the time-frequency transmission resource at least includes a PSSCH, a PSCCH, and an HARQ-ACK, and SCI is carried in the PSCCH and indicates position information about the HARQ-ACK feedback channel.

In a possible embodiment of the present disclosure, when receiving the time-frequency transmission resource for transmitting the feedback information for the unicasting or multicasting transmission from the source UE, the transceiver is further configured to: establish a connection with the source UE; and receive the time-frequency transmission resource from the source UE.

In a possible embodiment of the present disclosure, when transmitting the feedback information on the time-frequency transmission resource, the transceiver is further configured to: perform blind detection on the PSCCH to acquire position information about the PSCCH, the PSSCH and the HARQ-ACK feedback channel; after the position information about the PSSCH has been acquired, parse the PSSCH to acquire a unicasting or multicasting transmission state, and determine the feedback information in accordance with the unicasting or multicasting transmission state; and transmit the feedback information to the source UE through the HARQ-ACK feedback channel.

In a possible embodiment of the present disclosure, in a unicasting communication mode, the SCI includes a target ID indicator and an offset indicator; or in the unicasting communication mode, the SCI includes the target ID indicator, and a source ID indicator or a session ID/sequence ID indicator, and the source ID and the target ID are determined by the target UE and the source UE through negotiation or interaction in a connection establishment process; or in the unicasting communication mode, when the source ID, the target ID and an offset value are determined by the target UE and the source UE through negotiation or interaction in the connection establishment process, the SCI includes the target ID indicator, and the source ID or the session ID/sequence ID indicator.

In a possible embodiment of the present disclosure, when determining the feedback information in accordance with the unicasting or multicasting transmission state, the transceiver is further configured to generate a first sequence carrying ACK information in accordance with the SCI when the unicasting transmission has been performed successfully between the target UE and the source UE.

In a possible embodiment of the present disclosure, when generating the first sequence carrying the ACK information in accordance with the SCI, the transceiver is further configured to: when the SCI includes the source ID indicator, generate the first sequence in accordance with a system mapping and the source ID; or when the SCI includes the target ID indicator, generate the first sequence in accordance with the target ID and the offset value; or when the SCI includes the session ID/sequence ID indicator, generate the first sequence in accordance with the system mapping and a session ID/sequence ID.

In a possible embodiment of the present disclosure, when transmitting the feedback information to the source UE through the HARQ-ACK feedback channel, the transceiver is further configured to transmit the first sequence carrying the ACK information to the source UE through the HARQ-ACK feedback channel, and the feedback information is transmitted by the target UE in the unicasting communication mode merely when reception has been performed successfully.

In a possible embodiment of the present disclosure, when determining the feedback information in accordance with the unicasting or multicasting transmission state, the transceiver is further configured to, when the multicasting transmission has been performed unsuccessfully between the target UE and the source UE, generate a second sequence carrying NACK information in accordance with a target group ID, and the target group ID is determined by at least two target UEs and the source UE through negotiation or interaction in a multicasting connection establishment process.

In a possible embodiment of the present disclosure, when determining the feedback information in accordance with the unicasting or multicasting transmission state, the transceiver is further configured to, when the multicasting transmission has been performed unsuccessfully between the target UE and the source UE, generate a third sequence carrying NACK information in accordance with the target group ID and corresponding identification information. The target group ID and the identification information about the source UE and the target UEs are determined by the at least two target UEs and the source UE through negotiation or interaction in the connection establishment process, and different pieces of identification information about the target UEs correspond to different offset values.

In a possible embodiment of the present disclosure, when transmitting the feedback information to the source UE through the HARQ-ACK feedback channel, the transceiver is further configured to transmit the second sequence carrying the NACK information to the source UE through the HARQ-ACK feedback channel, and the feedback information is transmitted by the target UE in the multicasting communication mode merely when reception has been performed unsuccessfully.

In a possible embodiment of the present disclosure, when transmitting the feedback information to the source UE through the HARQ-ACK feedback channel, the transceiver is further configured to transmit the third sequence carrying the NACK information to the source UE through the HARQ-ACK feedback channel, and the feedback information is transmitted by the target UE in the multicasting communication mode merely when the reception has been performed unsuccessfully.

In a possible embodiment of the present disclosure, subsequent to transmitting the feedback information on the time-frequency transmission resource, the transceiver is further configured to, when the unicasting or multicasting transmission is performed unsuccessfully between the source UE and the target UE, determine that a retransmission process is to be initiated, and receive the reacquired time-frequency transmission resource from the source UE.

In still yet another aspect, the present disclosure provides in some embodiments a computer-readable storage medium storing therein a computer program. The computer program is executed by a processor so as to implement the steps in the transmission feedback method for the source UE or the target UE.

In still yet another aspect, the present disclosure provides in some embodiments a source UE, including: a first transmission module configured to transmit time-frequency transmission resource for transmitting feedback information for unicasting or multicasting transmission to at least one target UE which has established a connection with a source UE; an acquisition module configured to acquire the feedback information transmitted on the time-frequency transmission resource from the target UE; and a determination module configured to determine a unicasting or multicasting transmission state in accordance with the feedback information.

In still yet another aspect, the present disclosure provides in some embodiments a target UE, including: a reception module configured to receive a time-frequency transmission resource for transmitting feedback information for unicasting or multicasting transmission from a source UE; and a second transmission module configured to transmit the feedback information on the time-frequency transmission resource.

According to the embodiments of the present disclosure, the time-frequency transmission resource for transmitting feedback information for unicasting or multicasting transmission may be transmitted to at least one target UE which has established the connection with the source UE, the feedback information transmitted on the time-frequency transmission resource may be acquired from the target UE, and the unicasting or multicasting transmission state may be determined in accordance with the acquired feedback information. As a result, the source UE may acquire transmission state information through the introduction of feedback resources, so as to facilitate the determination of the retransmission between the source UE and the target UE and ensure the communication therebetween, thereby to solve the problem in the related art where no feedback resource is introduced for the unicasting and multicasting transmission.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
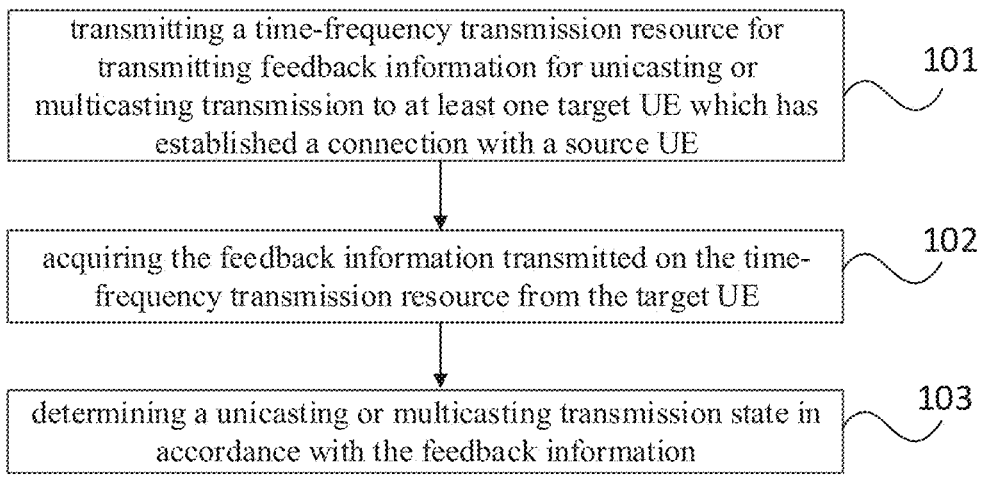
FIG. 1 is a flow chart of a transmission feedback method for a source UE according to one embodiment of the present disclosure.

The present disclosure provides in some embodiments a transmission feedback method which, as shown in FIG. 1, includes the following steps.

Step 101: transmitting a time-frequency transmission resource for transmitting feedback information for unicasting or multicasting transmission to at least one target UE which has established a connection with a source UE.

The transmission feedback method in the embodiments of the present disclosure may be applied to the source UE. At first, the source UE may acquire the time-frequency transmission resource for transmitting the feedback information for the unicasting or multicasting transmission, and transmit the acquired time-frequency transmission resource to the at least one target UE which has established the connection with the source UE. For the unicasting transmission, the source UE may transmit the acquired time-frequency transmission resource to one target UE, and for the multicasting transmission, the source UE may form a multicasting group with two or more target UEs, and it needs to transmit the time-frequency transmission resource to all the target UEs in the group. For each time-frequency transmission resource in a resource pool, it may be selected simultaneously for the unicasting transmission and the multicasting transmission. However, in a specific transmission procedure, the time-frequency transmission resource may be merely used for the unicasting or multicasting transmission.

Step 102: acquiring the feedback information transmitted on the time-frequency transmission resource from the target UE.

After the source UE has transmitted the time-frequency transmission resource to the at least one target UE, each target UE may determine a unicasting or multicasting transmission state in accordance with the received time-frequency transmission resource, and then transmit the feedback information to the source UE on the time-frequency transmission resource. At this time, the source UE may acquire the feedback information from one target UE during the unicasting transmission, and acquire the feedback information from at least one target UE in the group during the multicasting transmission.

Step 103: determining the unicasting or multicasting transmission state in accordance with the feedback information.

Upon the receipt of the feedback information from the target UE, the source UE may acquire the unicasting or multicasting transmission state carried in the feedback information, i.e., determine the unicasting or multicasting transmission state between the source UE and the target UE in accordance with the received feedback information. In a unicasting communication mode, the target UE may transmit the feedback information when the transmission has been performed successfully between the source UE and the target UE, and in a multicasting communication mode, the target UE may transmit the feedback information when the transmission is performed unsuccessfully between the source UE and the target UE in the group.

In the case that the transmission is performed unsuccessfully, the source UE may re-transmit the time-frequency transmission resource to the target UE, so as to perform the retransmission between the source UE and the target UE. In the case that the transmission is performed successfully, the source UE may perform a next transmission procedure when a next transmission block arrives.

According to the transmission feedback method in the embodiments of the present disclosure, through the introduction of feedback resources, the source UE may acquire transmission state information, so as to facilitate the determination of the retransmission between the source UE and the target UE, thereby to ensure the communication between the source UE and the target UE.

In some embodiments of the present disclosure, the time-frequency transmission resource may at least include a PSSCH, a PSCCH and a Hybrid Automatic Repeat Request-Acknowledgement (HARQ-ACK) feedback channel. SCI may be carried in the PSCCH and indicate position information about the HARQ-ACK feedback channel.

Apart from the PSSCH and the PSCCH, the time-frequency transmission resource transmitted by the source UE to the target UE may further include the HARQ-ACK feedback channel. The SCI may be carried in the PSCCH of the time-frequency transmission resource, and it may be used to indicate the position information about the HARQ-ACK feedback channel, so as to facilitate the target UE for the subsequent transmission of the feedback information through the HARQ-ACK feedback channel.

In some embodiments of the present disclosure, the transmitting the time-frequency transmission resource for transmitting the feedback information for unicasting or multicasting transmission to the at least one target UE which has established the connection with the source UE may include: establishing the connection with the at least one target UE; and autonomously selecting a time-frequency transmission resource or receiving a time-frequency transmission resource allocated by a network side device, and transmitting the time-frequency transmission resource to the target UE.

When transmitting the time-frequency transmission resource to the at least one target UE, at first the source UE needs to establish the connection with the at least one target UE. In the unicasting communication mode, the source UE needs to establish the connection with one target UE, and in the multicasting communication mode, the source UE needs to establish the connection with at least two target UEs in the group. After the connection establishment, the source UE may acquire the time-frequency transmission resource in two modes. In a first mode, the source UE may directly autonomously select the time-frequency transmission resource in the resource pool, and in a second mode, the source UE may receive the time-frequency transmission resource allocated by the network side device. Upon the acquisition of the time-frequency transmission resource in any of the above two modes, the source UE may transmit the time-frequency transmission resource to the at least one target UE. When the time-frequency transmission resource is acquired in any of the above modes, it is able for the source UE to acquire the resource flexibly.

A connection establishment process between the source UE and the target UE will be described hereinafter in the unicasting communication mode and the multicasting communication mode.

The establishing the connection with the at least one target UE may include: in the unicasting communication mode, establishing, by the source UE, the connection with one target UE; and in the connection establishment process, negotiating or interacting, by the source UE, with the target UE to determine a source ID and a target ID.

In the unicasting communication mode, the source UE needs to establish the connection with one target UE, and in the connection establishment process, the source UE may negotiate or interact with the target UE to determine the source ID and the target ID. Here, the source ID may correspond to the source UE, and the target ID may correspond to the target UE.

The establishing the connection with the at least one target UE may include: in the multicasting communication mode, establishing, by the source UE, the connection with at least two target UEs; and in the connection establishment process, negotiating or interacting, by the source UE, with the at least two target UEs to determine a target group ID and identification information about the source UE and the at least two target UEs.

In the multicasting communication mode, the source UE needs to establish the connection with at least two target UEs in the multicasting group. In the connection establishment process between the source UE and the at least two target UEs, the source UE may negotiate or interact with the at least two target UEs to determine a target group ID, as well as the identification information about the source UE and the identification information about the target UEs. Here, the target group ID represents an ID of the multicasting group consisting of the source UE and the at least two target UEs.

The source ID and the target ID may be determined through negotiation or interaction in the unicasting communication mode, and the target group ID and the identification information about the source UE and the target UEs may be determined through negotiation or interaction in the multicasting communication mode, so as to provide diversified determination modes, thereby to ensure the flexibility of a determination process.

A process of acquiring, by the source UE, the time-frequency transmission resource and transmitting it to the target UE will be described in details hereinafter in the unicasting and multicasting communication modes.

In some embodiments of the present disclosure, the autonomously selecting the time-frequency transmission resource or receiving the time-frequency transmission resource allocated by the network side device and transmitting the time-frequency transmission resource to the target UE may include: autonomously selecting, by the source UE, a time-frequency transmission resource from the resource pool, and transmitting the selected time-frequency transmission resource to the target UE; or after the network side device has allocated a time-frequency transmission resource in accordance with a service delay requirement of the source UE and a processing capability of the target UE, receiving the time-frequency transmission resource from the network side device and transmitting the time-frequency transmission resource to the target UE.

In the second mode, the source UE needs to autonomously select a time-frequency transmission resource from the resource pool, and then transmit the selected time-frequency transmission resource to the target UE.

In the first mode, the network side device needs to allocate the time-frequency transmission resource. In the unicasting communication mode, when allocating the time-frequency transmission resource, the network side device needs to acquire the following information. The network side device may receive Buffer Status Report (BSR) reported by the source UE. The BSR may include service ID information. The network side device may determine whether a unicasting resource or a multicasting resource is requested in accordance with a mapping between service IDs and transmission modes. The source UE may also directly indicate in the BSR that the unicasting resource is requested, or directly indicate that the quantity of members in the group is two. The network side device may also receive UE assist information reported by the resource UE, and a corresponding indication may be added in the UE assist information so as to directly indicate that the unicasting resource is request or directly indicate that the quantity of members in the group is two. At this time, the network side device may determine that the source UE is currently in the unicasting communication mode.

The network side device also needs to acquire the service delay requirement of the source UE and the processing capability of the target UE. The service delay requirement of the source UE is known in the related art. To be specific, the network side device may acquire the service delay requirement of the source UE through ProSe Per-Packet Priority (PPPP), Logical Channel Group (LCG) or enhanced Quality of Service (QoS). The processing capability of the target UE will not be mandatory. When it is impossible to acquire the processing capability of the target UE, a default minimum processing capability may be determined as the processing capability of the target UE.

In the unicasting communication mode, the network side device may acquire such information as the processing capability of each target UE and a geographical location of each target UE, but it does not know information about the target UE which has established the connection with the source UE. At this time, the source UE may report the related information to the network side device, so as to facilitate the allocation of PSSCH resources and feedback resources. For example, when the resource is requested through the BSR or UE assist information, the target ID may be carried. Here, the target ID is a 24-bit L2 ID. The network side device may acquire the related information through associative processing.

Upon the acquisition of the service delay requirement of the source UE and the processing capability of the target UE, the network side device may determine a time-frequency transmission resource, and transmit it to the source UE. At this time, the source UE may receive the time-frequency transmission resource from the network side device, and transmit it to the target UE.

It should be appreciated that, the time-frequency transmission resource allocated by the network side device may be indicated by the source UE in a corresponding mode on a sidelink (SL), and it is unnecessary to perform any further conversion.

In the first mode, the network side device needs to allocate the time-frequency transmission resource. In the multicasting communication mode, the time-frequency transmission resource may be allocated by the network side device. The network side device needs to acquire all or part of the following information. The network side device may receive BSR reported by the source UE. The BSR may include service ID information. The network side device may determine whether a unicasting resource or a multicasting resource is requested in accordance with a mapping between service IDs and transmission modes, rather than the quantity of members in the group. Hence, in a distinguishing mode through codewords, it is impossible to determine a size of the feedback resource in the time-frequency transmission resource. At this time, the source UE may directly indicate, in the BSR, the quantity of members in the group. The network side device may also receive UE assist information reported by the resource UE, and a corresponding indication may be added in the UE assist information so as to directly indicate the quantity of members in the group. At this time, the network side device may determine that the source UE is currently in the multicasting communication mode.

The network side device also needs to acquire the service delay requirement of the source UE and the processing capability of each target UE in the group. The service delay requirement of the source UE is known in the related art. To be specific, the network side device may acquire the service delay requirement of the source UE through PPPP, LCG or enhanced QoS. The processing capability of the target UE will not be mandatory. When it is impossible to acquire the processing capability of the target UE, a default minimum processing capability may be determined as the processing capability of the target UE.

After the network side device has allocated a time-frequency transmission resource, the source UE may receive the time-frequency transmission resource from the network side device, and transmit it to the target UE. At this time, the time-frequency transmission resource may be shared by the target UEs in the multicasting group.

In some embodiments of the present disclosure, in the unicasting communication mode, the SCI carried in the time-frequency transmission resource may include a target ID indicator and an offset indicator; or the SCI may include the target ID indicator, and a source ID indicator or a session ID/sequence ID indicator; or when the source UE has negotiated or interacted with the target UE in the connection establishment process to determine an offset value, the SCI may include the target ID indicator, and the source ID indicator or the session ID/sequence ID indicator.

In the unicasting communication mode, the source UE and the target UE may determine the source ID and the target ID through negotiation or interaction in the connection establishment process. The SCI carried in the time-frequency transmission resource may include the target ID indicator and the offset indicator, or include the target ID indicator, and the source ID indicator or the session ID/sequence ID indicator.

When the source UE and the target UE have determined the source ID and the target ID as well as an offset value through negotiation or interaction in the connection establishment process, the SCI may include the target ID indicator, and the source ID indicator or the session ID/sequence ID indicator.

It should be appreciated that, the target ID indicator is known in the related art, and based on this, the offset indicator and the source ID indicator or session ID/sequence ID indicator may be added. When an offset value has been determined through negotiation or interaction, the SCI may merely include the target ID indicator, or include the target ID indicator and the source ID indicator or session ID/sequence ID indicator.

In the unicasting communication mode, the acquiring the feedback information transmitted on the time-frequency transmission resource from the target UE may include: acquiring a first sequence in accordance with the SCI; and performing sliding-related peak detection on the HARQ-ACK feedback channel for the time-frequency transmission resource in accordance with sequence correlation, and acquiring the feedback information.

Because the SCI includes the ID indicator, the source UE may acquire the first sequence in accordance with information included in the SCI. Upon the acquisition of the first sequence in accordance with the SCI, the source UE may perform the sliding-related peak detection on the HARQ-ACK feedback channel for the time-frequency transmission resource in accordance with the sequence correlation, and then acquire the feedback information. In the unicasting communication mode, the feedback information may be detected merely when the unicasting transmission has been performed successfully.

The acquiring the first sequence in accordance with the SCI may include: when the SCI includes the source ID indicator, acquiring the first sequence generated by the target UE in accordance with a system mapping and the source ID; or when the SCI includes the target ID indicator, acquiring the first sequence generated by the target UE in accordance with the target ID and an offset value, the offset value being indicated in the SCI or determined by the source UE and the target UE through negotiation or interaction in the connection establishment process; or when the SCI includes the session ID/sequence ID indicator, acquiring the first sequence generated by the target UE in accordance with the system mapping and a session ID/sequence ID.

The first sequence may be acquired in different modes in accordance with the information included in the SCI. When the SCI includes the target ID indicator and the source ID indicator, the source UE may acquire the first sequence generated by the target UE in accordance with the system mapping and the source ID. It should be appreciated that, the first sequence here may be, but not limited to, an m sequence. A sync signal and a Demodulation Reference Signal (DMRS) in a New RAT (NR) are all m sequences.

When the SCI includes the target ID indicator and the session ID/sequence ID indicator, the source UE may acquire the first sequence generated by the target UE in accordance with the system mapping and the session ID/sequence ID.

When the SCI does not include the source ID indicator or the session ID/sequence ID indicator, it must include the target ID indicator. At this time, the source UE may acquire the first sequence generated by the target UE in accordance with the target ID and the offset value. When the source UE and the target UE have determined an offset value through negotiation or interaction in the connection establishment process, the offset value used herein may be just the offset value determined through negotiation or interaction. When no offset value has been determined by the source UE and the target UE in the connection establishment process, the offset value used herein may be the offset value indicated in the SCI.

In some embodiments of the present disclosure, in the multicasting communication mode, the acquiring the feedback information transmitted on the time-frequency transmission resource from the target UE may include: acquiring a second sequence generated by the target UE in accordance with the target group ID; and performing sliding-related peak detection on the HARQ-ACK feedback channel for the time-frequency transmission resource in accordance with sequence correlation, and acquiring the feedback information.

In the multicasting communication mode, when a target UE in the multicasting group has performed the reception unsuccessfully, the target UE may generate the second sequence in accordance with the target group ID determined in advance through negotiation or interaction. Because a same time-frequency transmission resource is shared by the target UEs, different UEs which have performed the reception unsuccessfully may generate the same second sequence in accordance with the target group ID. The source UE may acquire the second sequence, and perform the sliding-related peak detection on the HARQ-ACK feedback channel for the time-frequency transmission resource in accordance with the sequence correlation so as to acquire the feedback information. When the source UE has acquired the feedback information, it may determine that the multicasting transmission has been performed unsuccessfully.

In the multicasting communication mode, the acquiring the feedback information transmitted on the time-frequency transmission resource from the target UE may further include: acquiring a third sequence generated by the at least one target UE in accordance with the target group ID and corresponding identification information; and performing sliding-related peak detection on the HARQ-ACK feedback channel for the time-frequency transmission resource in accordance with the sequence correlation, and when NACK information has been detected in accordance with the third sequence, stopping the detection and acquiring the feedback information. Different pieces of identification information about the target UEs may correspond to different offset values.

It should be appreciated that, in the multicasting communication mode, the target group ID and the identification information about the source UE and the target UEs have been determined through negotiation or interaction in the connection establishment process, and different sequences or offset values may be adopted by different target UEs. Here, the sequence or offset value may correspond to the identification information about the target UE.

The target UE which has performed the reception unsuccessfully may generate the third sequence in accordance with the target group ID and the identification information determined in advance through negotiation or interaction. Because different target UEs correspond to different pieces of identification information and different pieces of identification information about the target UEs correspond to different offset values, different target UEs which have performed the reception unsuccessfully may generate different third sequences in accordance with the target group ID and the corresponding identification information, and then transmit the generated third sequences to the source UE. The source UE may perform the sliding-related peak detection on the HARQ-ACK feedback channel for the time-frequency transmission resource in accordance with the sequence correlation, and when the NACK information has been detected in accordance with the third sequence, stop the detection and acquire the feedback information indicating that the multicasting transmission has been performed unsuccessfully. In other words, a detection process may be stopped when the NACK information has been detected.

In some embodiments of the present disclosure, the determining the unicasting or multicasting transmission state in accordance with the feedback information may include: upon the receipt of ACK information from the target UE, determining that the unicasting transmission has been performed successfully between the source UE and the target UE; and upon the receipt of the NACK information from the target UE, determining that the multicasting transmission has been performed unsuccessfully between the source UE and the target UE. The feedback information may be transmitted by the target UE in the unicasting communication mode merely when reception has been performed successfully, and the feedback information may be transmitted by the target UE in the multicasting communication mode merely when the reception has been performed unsuccessfully.

When the unicasting transmission state is determined by the source UE and the received feedback information includes the ACK information, it means that the unicasting transmission has been performed successfully between the source UE and the target UE. When the received feedback information includes the NACK information, it means that the multicasting transmission has been performed unsuccessfully between the source UE and the target UE.

In other words, the feedback information may be transmitted by the target UE in the unicasting communication mode merely when the transmission is performed successfully, and the feedback information may be transmitted by the target UE in the multicasting communication mode merely when the transmission is performed unsuccessfully.

Brief description will be given hereinafter. In terms of reliability, the requirement of ACK-based reliability may be higher. For the NACK, its disadvantage lies in that a missing report may occur. For example, in the case that the PSCCH fails to be received, it is impossible to give a corresponding feedback. Identically, when the ACK is received, no feedback may be given either. In other words, it is impossible for the source UE to differentiate these two circumstances.

Hence, it is speculated that the NACK is transmitted merely when the multicasting reception is performed unsuccessfully, and the ACK is transmitted merely when the unicasting reception is performed successfully. In the other circumstances, no feedback may be given.

In some embodiments of the present disclosure, when the unicasting or multicasting transmission has been performed unsuccessfully between the source UE and the target UE, the transmission feedback method may further include initiating a retransmission process, and transmitting a reacquired time-frequency transmission resource to the target UE. When the unicasting or multicasting transmission has been performed unsuccessfully, the source UE needs to initiate the retransmission process. The source UE may reacquire the time-frequency transmission resource, e.g., autonomously select the time-frequency transmission resource or receive the time-frequency transmission resource allocated by the network side device, and then transmit the time-frequency transmission resource to the target UE.

According to the transmission feedback method in the embodiments of the present disclosure, the time-frequency transmission resource for transmitting feedback information for unicasting or multicasting transmission may be transmitted to at least one target UE which has established the connection with the source UE, the feedback information transmitted on the time-frequency transmission resource may be acquired from the target UE, and the unicasting or multicasting transmission state may be determined in accordance with the acquired feedback information. As a result, the source UE may acquire transmission state information through the introduction of feedback resources, so as to facilitate the determination of the retransmission between the source UE and the target UE and ensure the communication therebetween.

Figure 2:
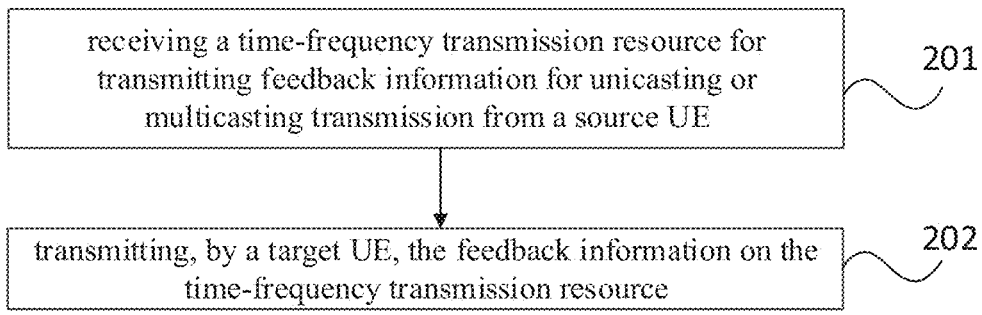
FIG. 2 is a flow chart of a transmission feedback method for a target UE according to one embodiment of the present disclosure.

The present disclosure further provides in some embodiments a transmission feedback method which, as shown in FIG. 2, includes the following steps.

Step 201: receiving a time-frequency transmission resource for transmitting feedback information for unicasting or multicasting transmission from a source UE.

The transmission feedback method in the embodiments of the present disclosure may be applied to a target UE. At first, the target UE may establish a connection with the source UE. For the unicasting transmission, one target UE needs to establish the connection with the source UE. For the multicasting transmission, at least two target UEs in a multicasting group need to establish the connection with the source UE. After the connection has been established between the target UE and the source UE, the target UE in a unicasting transmission state may receive the time-frequency transmission resource from the source UE, and each target UE in the group in a multicasting transmission state may receive the time-frequency transmission resource from the source UE.

Step 202: transmitting, by the target UE, the feedback information on the time-frequency transmission resource.

Upon the acquisition of the time-frequency transmission resource from the source UE, the unicasting or multicasting transmission state may be determined in accordance with the received time-frequency transmission resource, and then the feedback information may be transmitted on the time-frequency transmission resource to the source UE.

According to the transmission feedback method in the embodiments of the present disclosure, through the introduction of feedback resources, transmission state information may be transmitted to the source UE, so as to facilitate the determination of the retransmission between the source UE and the target UE, thereby to ensure the communication between the source UE and the target UE.

In some embodiments of the present disclosure, the time-frequency transmission resource may at least include a PSSCH, a PSCCH and an HARQ-ACK feedback channel. SCI may be carried in the PSCCH and indicate position information about the HARQ-ACK feedback channel.

Apart from the PSSCH and the PSCCH, the time-frequency transmission resource received by the target UE may further include the HARQ-ACK feedback channel. The SCI may be carried in the PSCCH of the time-frequency transmission resource, and it may be used to indicate the position information about the HARQ-ACK feedback channel, so as to facilitate the subsequent transmission of the feedback information to the source UE through the HARQ-ACK feedback channel.

In some embodiments of the present disclosure, the receiving the time-frequency transmission resource for transmitting the feedback information for the unicasting or multicasting transmission from the source UE may include: establishing a connection with the source UE; and receiving the time-frequency transmission resource from the source UE.

When receiving the time-frequency transmission resource from the source UE, at first the target UE needs to establish the connection with the source UE. In a unicasting communication mode, one target UE needs to establish the connection with the source UE, and in a multicasting communication mode, each target UE in the group needs to establish the connection with the source UE. After the connection establishment, the source UE may acquire the time-frequency transmission resource in two modes. In a first mode, the source UE may directly autonomously select the time-frequency transmission resource in the resource pool, and in a second mode, the source UE may receive the time-frequency transmission resource allocated by a network side device. After the source UE has acquired the time-frequency transmission resource in any of the above two modes, the target UE may receive the time-frequency transmission resource from the source UE.

In some embodiments of the present disclosure, the transmitting, by the target UE, the feedback information on the time-frequency transmission resource may include: performing blind detection on the PSCCH to acquire position information about the PSCCH, the PSSCH and the HARQ-ACK feedback channel; after the position information about the PSSCH has been acquired, parsing the PSSCH to acquire a unicasting or multicasting transmission state, and determining the feedback information in accordance with the unicasting or multicasting transmission state; and transmitting the feedback information to the source UE through the HARQ-ACK feedback channel.

When transmitting the feedback information, the target UE needs to process the received time-frequency transmission resource. To be specific, the blind detection may be performed on the PSCCH of the time-frequency transmission resource, so as to acquire the position information about the PSCCH, the PSSCH and the HARQ-ACK feedback channel. Next, the PSSCH may be parsed, and the unicasting or multicasting transmission state may be acquired in accordance with a parsing result. Next, the feedback information may be determined in accordance with the acquired unicasting or multicasting transmission state. Finally, the determined feedback information may be transmitted to the source UE through the HARQ-ACK feedback channel.

A process of determining the feedback information in accordance with the unicasting or multicasting transmission state and transmitting the feedback information to the source UE through the HARQ-ACK feedback channel will be described hereinafter briefly with respect to the unicasting and multicasting transmission.

Unicasting Transmission

In a unicasting communication mode, the SCI may include a target ID indicator and an offset indicator; or in the unicasting communication mode, the SCI may include the target ID indicator, and a source ID indicator or a session ID/sequence ID indicator, and the source ID and the target ID may be determined by the target UE and the source UE through negotiation or interaction in a connection establishment process; or in the unicasting communication mode, when the source ID, the target ID and an offset value are determined by the target UE and the source UE through negotiation or interaction in the connection establishment process, the SCI may include the target ID indicator, and the source ID or the session ID/sequence ID indicator.

In the unicasting communication mode, the source UE and the target UE may determine the source ID and the target ID through negotiation or interaction in the connection establishment process. The SCI may include the target ID indicator and the offset indicator, or include the target ID indicator, and the source ID indicator or the session ID/sequence ID indicator.

When the source UE and the target UE have determined the source ID and the target ID as well as an offset value through negotiation or interaction in the connection establishment process, the SCI may include the target ID indicator, and the source ID indicator or the session ID/sequence ID indicator.

It should be appreciated that, the target ID indicator is known in the related art, and based on this, the offset indicator and the source ID indicator or session ID/sequence ID indicator may be added. When an offset value has been determined through negotiation or interaction, the SCI may merely include the target ID indicator, or include the target ID indicator and the source ID indicator or session ID/sequence ID indicator.

In the unicasting communication mode, the determining the feedback information in accordance with the unicasting or multicasting transmission state may include generating, by the target UE, a first sequence carrying ACK information in accordance with the SCI when the unicasting transmission has been performed successfully between the target UE and the source UE.

When the unicasting transmission has been performed successfully between the source UE and the target UE, the target UE may generate the feedback information in accordance with the SCI. At this time, the feedback information may be the first sequence carrying the ACK information. It is able to determine the unicasting transmission state in accordance with the generated first sequence.

The generating, by the target UE, the first sequence carrying the ACK information in accordance with the SCI may include: when the SCI includes the source ID indicator, generating, by the target UE, the first sequence in accordance with a system mapping and the source ID; or when the SCI includes the target ID indicator, generating, by the target UE, the first sequence in accordance with the target ID and the offset value; or when the SCI includes the session ID/sequence ID indicator, generating, by the target UE, the first sequence in accordance with the system mapping and a session ID/sequence ID.

The first sequence may be generated in different modes in accordance with the information included in the SCI. When the SCI includes the target ID indicator and the source ID indicator, the target UE may generate the first sequence in accordance with the system mapping and the source ID. It should be appreciated that, the first sequence here may be, but not limited to, an m sequence. A sync signal and a DMRS in an NR are all m sequences.

When the SCI includes the target ID indicator and the session ID/sequence ID indicator, the target UE may generate the first sequence in accordance with the system mapping and the session ID/sequence ID.

When the SCI does not include the source ID indicator or the session ID/sequence ID indicator, it must include the target ID indicator. At this time, the target UE may generate the first sequence in accordance with the target ID and the offset value. When the source UE and the target UE have determined an offset value through negotiation or interaction in the connection establishment process, the offset value used herein may be just the offset value determined through negotiation or interaction. When no offset value has been determined by the source UE and the target UE in the connection establishment process, the offset value used herein may be the offset value indicated in the SCI.

For the unicasting transmission, the transmitting the feedback information to the source UE through the HARQ-ACK feedback channel may include transmitting the first sequence carrying the ACK information to the source UE through the HARQ-ACK feedback channel, and the feedback information may be transmitted by the target UE in the unicasting communication mode merely when reception has been performed successfully.

After the generation of the first sequence carrying the ACK information, the target UE may transmit the first sequence to the source UE through the HARQ-ACK feedback channel, so that the source UE may perform sliding-related peak detection on the HARQ-ACK feedback resource for the time-frequency transmission resource in accordance with sequence correlation to acquire the feedback information indicating that the unicasting transmission has been performed successfully.

Multicasting Transmission

The determining the feedback information in accordance with the unicasting or multicasting transmission state may include, when the multicasting transmission has been performed unsuccessfully between the target UE and the source UE, generating, by the target UE which has performed reception unsuccessfully, a second sequence carrying NACK information in accordance with a target group ID, and the target group ID may be determined by at least two target UEs and the source UE through negotiation or interaction in a multicasting connection establishment process.

When the transmission between the target UE in the group and the source UE has been performed unsuccessfully, the target UE which has performed the reception unsuccessfully may generate the second sequence in accordance with the target group ID determined in the connection establishment process. Because a same time-frequency transmission resource is multiplexed by the target UEs, different UEs which have performed the reception unsuccessfully may generate the same second sequence in accordance with the target group ID, and the generated second sequence may carry the NACK information. The source UE may determine that the multicasting transmission has been performed unsuccessfully in accordance with the second sequence.

The transmitting the feedback information to the source UE through the HARQ-ACK feedback channel may include transmitting the second sequence carrying the NACK information to the source UE through the HARQ-ACK feedback channel, and the feedback information may be transmitted by the target UE in the multicasting communication mode merely when the reception has been performed unsuccessfully.

In the mode where the second sequence is generated in accordance with the target group ID, during the transmission of the feedback information, the target UE may transmit the second sequence carrying the NACK information to the source UE through the HARQ-ACK feedback channel, so that the source UE may perform the sliding-related peak detection on the HARQ-ACK feedback channel for the time-frequency transmission resource in accordance with the sequence correlation so as to acquire the feedback information indicating that the multicasting transmission has been performed unsuccessfully.

The determining the feedback information according to a unicasting or multicasting transmission state may further include, when the multicasting transmission has been performed unsuccessfully between the target UE and the source UE, generating, by the target UE which has performed the reception unsuccessfully, a third sequence carrying NACK information in accordance with the target group ID and corresponding identification information. The target group ID and the identification information about the source UE and the target UEs may be determined by the at least two target UEs and the source UE through negotiation or interaction in the connection establishment process, and different pieces of identification information about the target UEs may correspond to different offset values.

For the multicasting transmission, the target group ID and the identification information about the source UE and the target UEs have been determined through negotiation or interaction in the connection establishment process, and different sequences or offset values may be adopted by different target UEs. Here, the sequence or offset value may correspond to the identification information about the target UE.

The target UE which has performed the reception unsuccessfully may generate the third sequence in accordance with the target group ID and the identification information determined in advance through negotiation or interaction. Because different target UEs correspond to different pieces of identification information and different pieces of identification information about the target UEs correspond to different offset values, different target UEs which have performed the reception unsuccessfully may generate different third sequences in accordance with the target group ID and the corresponding identification information, and then transmit the generated third sequences to the source UE. The source UE may perform the sliding-related peak detection on the HARQ-ACK feedback channel for the time-frequency transmission resource in accordance with the sequence correlation, and when the NACK information has been detected in accordance with the third sequence, stop the detection and acquire the feedback information indicating that the multicasting transmission has been performed unsuccessfully. In other words, a detection process may be stopped when the NACK information has been detected.

The transmitting the feedback information to the source UE through the HARQ-ACK feedback channel may include transmitting, by the target UE, the third sequence carrying the NACK information to the source UE through the HARQ-ACK feedback channel, and the feedback information may be transmitted by the target UE in the multicasting communication mode merely when the reception has been performed unsuccessfully.

In the mode where the third sequence is generated in accordance with the target group ID and the corresponding identification information, during the transmission of the feedback information, the third sequence carrying the NACK information may be transmitted by the target UE to the source UE through the HARQ-ACK feedback channel. Here, the target UE is a target UE which has performed the reception unsuccessfully, and the quantity of the target UEs may be at least one. The source UE may perform the sliding-related peak detection on the HARQ-ACK feedback channel for the time-frequency transmission resource in accordance with the sequence correlation, and when the NACK information has been detected in accordance with the third sequence, stop the detection and acquire the feedback information indicating that the multicasting transmission has been performed unsuccessfully. In other words, a detection process may be stopped when the NACK information has been detected.

In the embodiments of the present disclosure, for the multicasting transmission, when the transmission has been performed unsuccessfully, the feedback information carrying the NACK information may be transmitted, and the source UE may determine that the multicasting transmission has been performed unsuccessfully in accordance with the feedback information.

In some embodiments of the present disclosure, subsequent to transmitting, by the target UE, the feedback information on the time-frequency transmission resource, when the unicasting or multicasting transmission is performed unsuccessfully between the source UE and the target UE, the transmission feedback method may further include determining that a retransmission process is to be initiated, and receiving the reacquired time-frequency transmission resource from the source UE.

When the unicasting or multicasting transmission has been performed unsuccessfully, the source UE needs to initiate the retransmission process. The source UE may reacquire the time-frequency transmission resource, e.g., autonomously select the time-frequency transmission resource or receive the time-frequency transmission resource allocated by the network side device, and then transmit the time-frequency transmission resource to the target UE. At this time, the target UE may receive the time-frequency transmission resource reacquired by the source UE.

According to the transmission feedback method in the embodiments of the present disclosure, the time-frequency transmission resource for transmitting the feedback information for the unicasting or multicasting transmission may be received from the source UE, the feedback information may be transmitted on the time-frequency transmission resource, and the unicasting or multicasting transmission state may be transmitted to the source UE. As a result, the source UE may acquire transmission state information through the introduction of feedback resources, so as to facilitate the determination of the retransmission between the source UE and the target UE and ensure the communication therebetween.

It should be further appreciated that, such expression as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

In the embodiments of the present disclosure, it should be further appreciated that, serial numbers of the steps shall not be used to define an order of the steps, and instead, the order of the steps shall be determined in accordance with their functions and internal logics, which shall not be construed as limiting the implementation of the embodiments of the present disclosure.

In the embodiments of the present disclosure, the network side device usually refers to a base station. The form of the base station will not be particularly defined, and it may be a macro base station, a pico base station, a Node B (i.e., a $3^{rd}$-Generation (3G) base station), an evolved NodeB (eNB), a femto eNB (or Home eNode B or Home eNB (HeNB)), a relay, an access point, a Remote Radio Unit (RRU), a Remote Radio Head (RRH), or a network side node in a $5^{th}$-Generation (5G) mobile communication system (e.g., a Central Unit (CU) or a Distributed Unit (DU)). The UE may be a mobile phone (or cellphone) or any other device capable of transmitting or receiving a radio signal, including a terminal, a Personal Digital Assistant (PDA), a wireless modem, a wireless communication device, a handheld device, a laptop computer, a cordless telephone, a Wireless Local Loop (WLL) station, Customer Premise Equipment (CPE) or an Mifi capable of converting a mobile signal into a WiFi signal, an intelligent household electrical appliance, or any other device capable of spontaneously communicating with a mobile communication network.

Based on the above methods, the present disclosure further provides in some embodiments devices for implementing the above methods.

Figure 3:
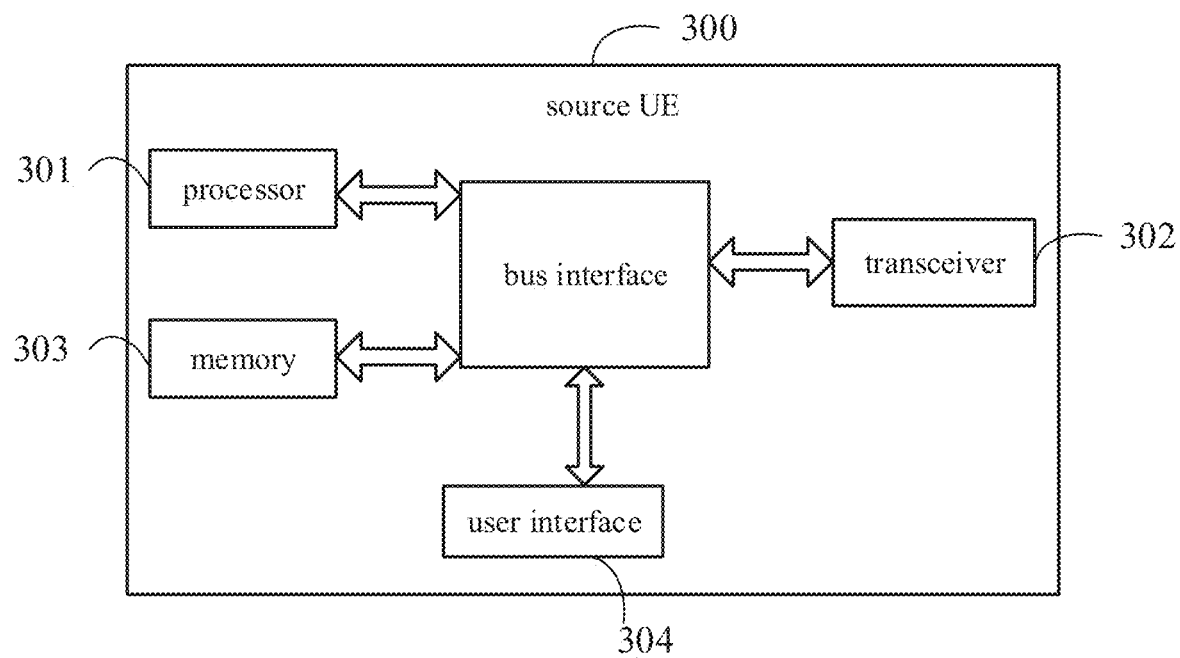
FIG. 3 is a schematic view showing the source UE according to one embodiment of the present disclosure.

As shown in FIG. 3, the present disclosure provides in some embodiments a source UE 300 which includes a processor 301, a transceiver 302, a memory 303, a user interface 304 and a bus interface.

In some embodiments of the present disclosure, the source UE 300 may further include a computer program stored in the memory 303 and executed by the processor 301. The transceiver 302 is configured to read the computer program in the memory 303, so as to transmit a time-frequency transmission resource for transmitting feedback information for unicasting or multicasting transmission to at least one target UE which has established a connection with the source UE. The processor 301 is configured to: acquire the feedback information transmitted on the time-frequency transmission resource from the target UE; and determine a unicasting or multicasting transmission state in accordance with the feedback information.

In FIG. 3, bus architecture may include any number of buses and bridges connected to each other, so as to connect various circuits for one or more processors 301 and one or more memories 303. In addition, as is known in the art, the bus architecture 1000 may be used to connect any other circuits, such as a circuit for a peripheral device, a circuit for a voltage stabilizer and a power management circuit, which are not particularly defined herein. A bus interface may be provided, and the transceiver 302 may consist of a plurality of elements, i.e., a transmitter and a receiver for communication with any other devices over a transmission medium. With respect to different UEs, a user interface 304 may also be provided for devices which are to be arranged inside or outside the UE, and these devices may include but not limited to a keypad, a display, a speaker, a microphone and a joystick.

The processor 301 may take charge of managing the bus architecture as well as general processings. The memory 303 may store therein data for the operation of the processor 301.

In a possible embodiment of the present disclosure, the time-frequency transmission resource may at least include a PSSCH, a PSCCH, and an HARQ-ACK feedback channel, and SCI may be carried in the PSCCH and indicate position information about the HARQ-ACK feedback channel.

In a possible embodiment of the present disclosure, when transmitting the time-frequency transmission resource for transmitting the feedback information for unicasting or multicasting transmission to the at least one target UE which has established the connection with the source UE, the transceiver 302 is further configured to: establish the connection with the at least one target UE; and autonomously select a time-frequency transmission resource or receive a time-frequency transmission resource allocated by a network side device, and transmit the time-frequency transmission resource to the target UE.

In a possible embodiment of the present disclosure, when establishing the connection with the at least one target UE, the transceiver 302 is further configured to: in a unicasting communication mode, establish the connection with one target UE; and in a connection establishment process, negotiate or interact with the target UE to determine a source ID and a target ID.

In a possible embodiment of the present disclosure, when establishing the connection with the at least one target UE, the transceiver 302 is further configured to: in a multicasting communication mode, establish the connection with at least two target UEs; and in a connection establishment process, negotiate or interact with the at least two target UEs to determine a target group ID and identification information about the source UE and the at least two target UEs.

In a possible embodiment of the present disclosure, when autonomously selecting the time-frequency transmission resource or receiving the time-frequency transmission resource allocated by the network side device and transmitting the time-frequency transmission resource to the target UE, the transceiver 302 is further configured to: autonomously select a time-frequency transmission resource from a resource pool, and transmit the selected time-frequency transmission resource to the target UE; or after the network side device has allocated a time-frequency transmission resource in accordance with a service delay requirement of the source UE and a processing capability of the target UE, receive the time-frequency transmission resource from the network side device and transmit the time-frequency transmission resource to the target UE.

In a possible embodiment of the present disclosure, the SCI carried in the time-frequency transmission resource may include a target ID indicator and an offset indicator; or the SCI may include the target ID indicator, and a source ID indicator or a session ID/sequence ID indicator; or when the source UE has negotiated or interacted with the target UE in the connection establishment process to determine an offset value, the SCI may include the target ID indicator, and the source ID indicator or the session ID/sequence ID indicator.

In a possible embodiment of the present disclosure, when acquiring the feedback information transmitted on the time-frequency transmission resource from the target UE, the processor 301 is further configured to: acquire a first sequence in accordance with the SCI; and perform sliding-related peak detection on the HARQ-ACK feedback channel for the time-frequency transmission resource in accordance with sequence correlation, and acquire the feedback information.

In a possible embodiment of the present disclosure, when acquiring the first sequence in accordance with the SCI, the processor 301 is further configured to: when the SCI includes the source ID indicator, acquire the first sequence generated by the target UE in accordance with a system mapping and the source ID; or when the SCI includes the target ID indicator, acquire the first sequence generated by the target UE in accordance with the target ID and an offset value, the offset value being indicated in the SCI or determined by the source UE and the target UE through negotiation or interaction in the connection establishment process; or when the SCI includes the session ID/sequence ID indicator, acquire the first sequence generated by the target UE in accordance with the system mapping and a session ID/sequence ID.

In a possible embodiment of the present disclosure, when acquiring the feedback information transmitted on the time-frequency transmission resource from the target UE, the processor 301 is further configured to: acquire a second sequence generated by the target UE in accordance with the target group ID; and perform sliding-related peak detection on the HARQ-ACK feedback channel for the time-frequency transmission resource in accordance with sequence correlation, and acquire the feedback information.

In a possible embodiment of the present disclosure, when acquiring the feedback information transmitted on the time-frequency transmission resource from the target UE, the processor 301 is further configured to: acquire a third sequence generated by the at least one target UE in accordance with the target group ID and corresponding identification information; and perform sliding-related peak detection on the HARQ-ACK feedback channel for the time-frequency transmission resource in accordance with the sequence correlation, and when NACK information has been detected in accordance with the third sequence, stop the detection and acquire the feedback information. Different pieces of identification information about the target UEs may correspond to different offset values.

In a possible embodiment of the present disclosure, when determining the unicasting or multicasting transmission state in accordance with the feedback information, the processor 301 is further configured to: upon the receipt of ACK information from the target UE, determine that the unicasting transmission has been performed successfully between the source UE and the target UE; and upon the receipt of the NACK information from the target UE, determine that the multicasting transmission has been performed unsuccessfully between the source UE and the target UE. The feedback information may be transmitted by the target UE in the unicasting communication mode merely when reception has been performed successfully, and the feedback information may be transmitted by the target UE in the multicasting communication mode merely when the reception has been performed unsuccessfully.

In a possible embodiment of the present disclosure, when the unicasting or multicasting transmission has been performed unsuccessfully between the source UE and the target UE, the transceiver 302 is further configured to initiate a retransmission process, and transmit the reacquired time-frequency transmission resource to the target UE.

The present disclosure further provides in some embodiments a computer-readable storage medium storing therein a computer program. The computer program is executed by a transceiver so as to transmit time-frequency transmission resource for transmitting feedback information for unicasting or multicasting transmission to at least one target UE which has established a connection with a source UE. The computer program is executed by a processor, so as to: acquire the feedback information transmitted on the time-frequency transmission resource from the target UE; and determine a unicasting or multicasting transmission state in accordance with the feedback information.

When the computer program is executed by the transceiver and the processor, it is able to achieve all implementation modes in the embodiments involving the transmission feedback method for the source UE, which will not be particularly defined herein.

Figure 4:
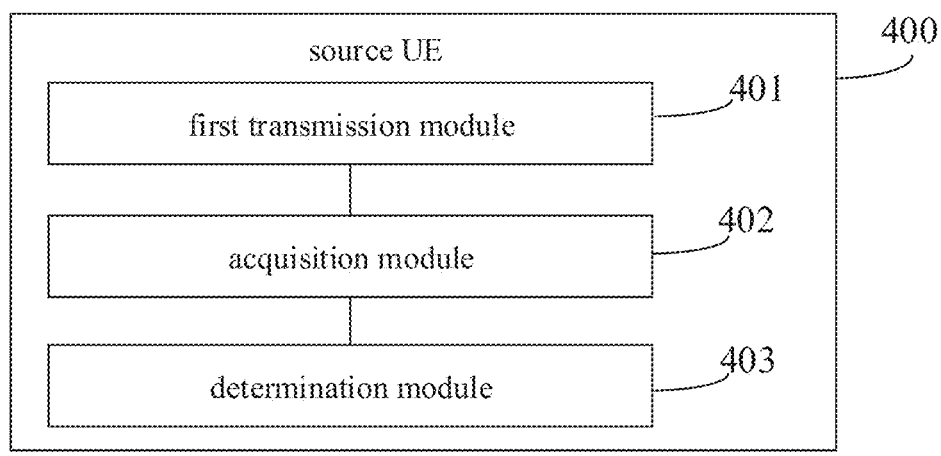
FIG. 4 is another schematic view showing the source UE according to one embodiment of the present disclosure.

As shown in FIG. 4, the present disclosure further provides in some embodiments a source UE 400 which includes: a first transmission module 401 configured to transmit time-frequency transmission resource for transmitting feedback information for unicasting or multicasting transmission to at least one target UE which has established a connection with the source UE; an acquisition module 402 configured to acquire the feedback information transmitted on the time-frequency transmission resource from the target UE; and a determination module 403 configured to determine a unicasting or multicasting transmission state in accordance with the feedback information.

The time-frequency transmission resource may at least include a PSSCH, a PSCCH, and an HARQ-ACK feedback channel, and SCI may be carried in the PSCCH and indicate position information about the HARQ-ACK feedback channel.

The first transmission module may include: a first establishment sub-module configured to establish the connection with the at least one target UE; and a first transmission sub-module configured to autonomously select a time-frequency transmission resource or receive a time-frequency transmission resource allocated by a network side device, and transmit the time-frequency transmission resource to the target UE.

The first establishment sub-module is further configured to: in a unicasting communication mode, establish the connection with one target UE; and in a connection establishment process, negotiate or interact with the target UE to determine a source ID and a target ID.

The first establishment sub-module is further configured to: in a multicasting communication mode, establish the connection with at least two target UEs; and in a connection establishment process, negotiate or interact with the at least two target UEs to determine a target group ID and identification information about the source UE and the at least two target UEs.

The first transmission sub-module is further configured to: autonomously select a time-frequency transmission resource from a resource pool, and transmit the selected time-frequency transmission resource to the target UE; or after the network side device has allocated a time-frequency transmission resource in accordance with a service delay requirement of the source UE and a processing capability of the target UE, receive the time-frequency transmission resource from the network side device and transmit the time-frequency transmission resource to the target UE.

The SCI carried in the time-frequency transmission resource may include a target ID indicator and an offset indicator; or the SCI may include the target ID indicator, and a source ID indicator or a session ID/sequence ID indicator; or when the source UE has negotiated or interacted with the target UE in the connection establishment process to determine an offset value, the SCI may include the target ID indicator, and the source ID indicator or the session ID/sequence ID indicator.

The acquisition module may include: a first acquisition sub-module configured to acquire a first sequence in accordance with the SCI; and a second acquisition sub-module configured to perform sliding-related peak detection on the HARQ-ACK feedback channel for the time-frequency transmission resource in accordance with sequence correlation, and acquire the feedback information.

The first acquisition sub-module is further configured to: when the SCI includes the source ID indicator, acquire the first sequence generated by the target UE in accordance with a system mapping and the source ID; or when the SCI includes the target ID indicator, acquire the first sequence generated by the target UE in accordance with the target ID and an offset value, the offset value being indicated in the SCI or determined by the source UE and the target UE through negotiation or interaction in the connection establishment process; or when the SCI includes the session ID/sequence ID indicator, acquire the first sequence generated by the target UE in accordance with the system mapping and a session ID/sequence ID.

The acquisition module may further include: a third acquisition sub-module configured to acquire a second sequence generated by the target UE in accordance with the target group ID; and a fourth acquisition sub-module configured to perform sliding-related peak detection on the HARQ-ACK feedback channel for the time-frequency transmission resource in accordance with sequence correlation, and acquire the feedback information.

The acquisition module may further include: a fifth acquisition sub-module configured to acquire a third sequence generated by the at least one target UE in accordance with the target group ID and corresponding identification information; and a sixth acquisition sub-module configured to perform sliding-related peak detection on the HARQ-ACK feedback channel for the time-frequency transmission resource in accordance with the sequence correlation, and when NACK information has been detected in accordance with the third sequence, stop the detection and acquire the feedback information. Different pieces of identification information about the target UEs may correspond to different offset values.

The determination module is further configured to: upon the receipt of ACK information from the target UE, determine that the unicasting transmission has been performed successfully between the source UE and the target UE; and upon the receipt of the NACK information from the target UE, determine that the multicasting transmission has been performed unsuccessfully between the source UE and the target UE. The feedback information may be transmitted by the target UE in the unicasting communication mode merely when reception has been performed successfully, and the feedback information may be transmitted by the target UE in the multicasting communication mode merely when the reception has been performed unsuccessfully.

When the unicasting or multicasting transmission has been performed unsuccessfully between the source UE and the target UE, the source UE may further include a first processing module configured to initiate a retransmission process, and transmit the reacquired time-frequency transmission resource to the target UE.

According to the source UE in the embodiments of the present disclosure, the time-frequency transmission resource for transmitting feedback information for unicasting or multicasting transmission may be transmitted to at least one target UE which has established the connection with the source UE, the feedback information transmitted on the time-frequency transmission resource may be acquired from the target UE, and the unicasting or multicasting transmission state between the source UE and the target UE may be determined in accordance with the acquired feedback information. As a result, the source UE may acquire transmission state information through the introduction of feedback resources, so as to facilitate the determination of the retransmission between the source UE and the target UE and ensure the communication therebetween.

Figure 5:
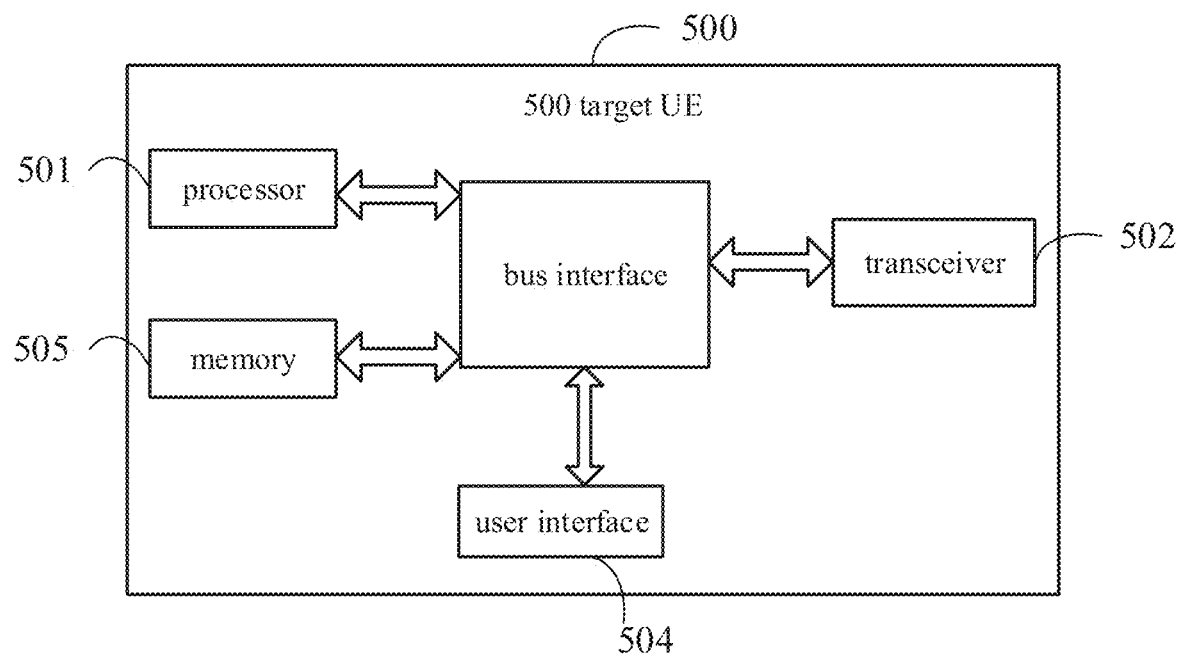
FIG. 5 is a schematic view showing the target UE according to one embodiment of the present disclosure.

As shown in FIG. 5, the present disclosure further provides in some embodiments a target UE 500 which includes a processor 501, a transceiver 502, a memory 503 and a bus interface.

In some embodiments of the present disclosure, the target UE 500 may further include a computer program stored in the memory 503 and executed by the processor 501. The transceiver 502 is configured to read the computer program in the memory 503, so as to: receive a time-frequency transmission resource for transmitting feedback information for unicasting or multicasting transmission from a source UE; and transmit the feedback information on the time-frequency transmission resource.

In FIG. 5, bus architecture may include a number of buses and bridges connected to each other, so as to connect various circuits for one or more processors 501 and one or more memories 503. In addition, as is known in the art, the bus architecture may be used to connect any other circuits, such as a circuit for a peripheral device, a circuit for a voltage stabilizer and a power management circuit. The bus interface may be provided, and the transceiver 502 may consist of a plurality of elements, i.e., a transmitter and a receiver for communication with any other devices over a transmission medium.

The processor 501 may take charge of managing the bus architecture as well as general processings. The memory 503 may store therein data for the operation of the processor 501.

In a possible embodiment of the present disclosure, the time-frequency transmission resource may at least include a PSSCH, a PSCCH, and an HARQ-ACK feedback channel, and SCI may be carried in the PSCCH and indicate position information about the HARQ-ACK feedback channel.

In a possible embodiment of the present disclosure, when receiving the time-frequency transmission resource for transmitting the feedback information for the unicasting or multicasting transmission from the source UE, the transceiver 502 is further configured to: establish a connection with the source UE; and receive the time-frequency transmission resource from the source UE.

In a possible embodiment of the present disclosure, when transmitting the feedback information on the time-frequency transmission resource, the transceiver 502 is further configured to: perform blind detection on the PSCCH to acquire position information about the PSCCH, the PSSCH and the HARQ-ACK feedback channel; after the position information about the PSSCH has been acquired, parse the PSSCH to acquire a unicasting or multicasting transmission state, and determine the feedback information in accordance with the unicasting or multicasting transmission state; and transmit the feedback information to the source UE through the HARQ-ACK feedback channel.

In a possible embodiment of the present disclosure, in a unicasting communication mode, the SCI may include a target ID indicator and an offset indicator; or in the unicasting communication mode, the SCI may include the target ID indicator, and a source ID indicator or a session ID/sequence ID indicator, and the source ID and the target ID may be determined by the target UE and the source UE through negotiation or interaction in a connection establishment process; or in the unicasting communication mode, when the source ID, the target ID and an offset value are determined by the target UE and the source UE through negotiation or interaction in the connection establishment process, the SCI may include the target ID indicator, and the source ID or the session ID/sequence ID indicator.

In a possible embodiment of the present disclosure, when determining the feedback information in accordance with the unicasting or multicasting transmission state, the transceiver 502 is further configured to generate a first sequence carrying ACK information in accordance with the SCI when the unicasting transmission has been performed successfully between the target UE and the source UE.

In a possible embodiment of the present disclosure, when generating the first sequence carrying the ACK information in accordance with the SCI, the transceiver 502 is further configured to: when the SCI includes the source ID indicator, generate the first sequence in accordance with a system mapping and the source ID; or when the SCI includes the target ID indicator, generate the first sequence in accordance with the target ID and the offset value; or when the SCI includes the session ID/sequence ID indicator, generate the first sequence in accordance with the system mapping and a session ID/sequence ID.

In a possible embodiment of the present disclosure, when transmitting the feedback information to the source UE through the HARQ-ACK feedback channel, the transceiver 502 is further configured to transmit the first sequence carrying the ACK information to the source UE through the HARQ-ACK feedback channel, and the feedback information may be transmitted by the target UE in the unicasting communication mode merely when reception has been performed successfully.

In a possible embodiment of the present disclosure, when determining the feedback information in accordance with the unicasting or multicasting transmission state, the transceiver 502 is further configured to, when the multicasting transmission has been performed unsuccessfully between the target UE and the source UE, generate a second sequence carrying NACK information in accordance with a target group ID, and the target group ID may be determined by at least two target UEs and the source UE through negotiation or interaction in a multicasting connection establishment process.

In a possible embodiment of the present disclosure, when determining the feedback information in accordance with the unicasting or multicasting transmission state, the transceiver 502 is further configured to, when the multicasting transmission has been performed unsuccessfully between the target UE and the source UE, generate a third sequence carrying NACK information in accordance with the target group ID and corresponding identification information. The target group ID and the identification information about the source UE and the target UEs may be determined by the at least two target UEs and the source UE through negotiation or interaction in the connection establishment process, and different pieces of identification information about the target UEs may correspond to different offset values.

In a possible embodiment of the present disclosure, when transmitting the feedback information to the source UE through the HARQ-ACK feedback channel, the transceiver 502 is further configured to transmit the second sequence carrying the NACK information to the source UE through the HARQ-ACK feedback channel, and the feedback information may be transmitted by the target UE in the multicasting communication mode merely when reception has been performed unsuccessfully.

In a possible embodiment of the present disclosure, when transmitting the feedback information to the source UE through the HARQ-ACK feedback channel, the transceiver 502 is further configured to transmit the third sequence carrying the NACK information to the source UE through the HARQ-ACK feedback channel, and the feedback information may be transmitted by the target UE in the multicasting communication mode merely when the reception has been performed unsuccessfully.

In a possible embodiment of the present disclosure, subsequent to transmitting the feedback information on the time-frequency transmission resource, the transceiver 502 is further configured to, when the unicasting or multicasting transmission is performed unsuccessfully between the source UE and the target UE, determine that a retransmission process is to be initiated, and receive the reacquired time-frequency transmission resource from the source UE.

The present disclosure further provides in some embodiments a computer-readable storage medium storing therein a computer program. The computer program is executed by a transceiver so as to: receive a time-frequency transmission resource for transmitting feedback information for unicasting or multicasting transmission from a source UE; and transmit the feedback information on the time-frequency transmission resource.

When the computer program is executed by the transceiver, it is able to achieve all implementation modes in the embodiments involving the transmission feedback method for the target UE, which will not be particularly defined herein.

Figure 6:
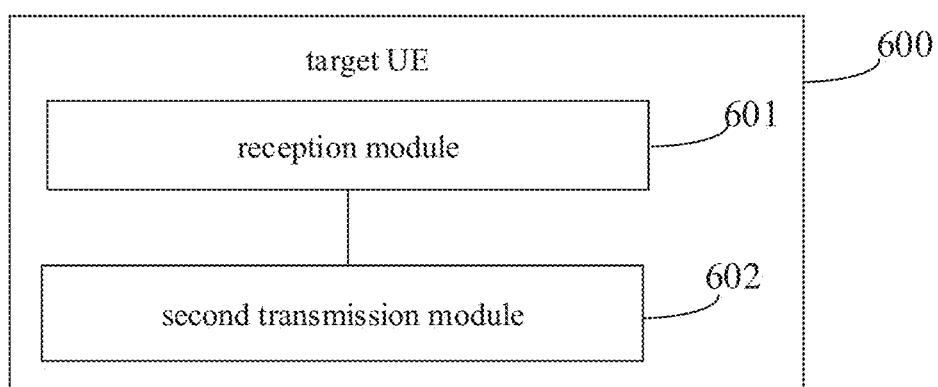
FIG. 6 is another schematic view showing the target UE according to one embodiment of the present disclosure.

As shown in FIG. 6, the present disclosure further provides in some embodiments a target UE 600 which includes: a reception module 601 configured to receive a time-frequency transmission resource for transmitting feedback information for unicasting or multicasting transmission from a source UE; and a second transmission module 602 configured to transmit the feedback information on the time-frequency transmission resource.

In a possible embodiment of the present disclosure, the time-frequency transmission resource may at least include a PSSCH, a PSCCH, and an HARQ-ACK feedback channel, and SCI may be carried in the PSCCH and indicate position information about the HARQ-ACK feedback channel.

The reception module may include: a second establishment sub-module configured to establish a connection with the source UE; and a reception sub-module configured to receive the time-frequency transmission resource from the source UE.

The second transmission module may include: a seventh acquisition sub-module configured to perform blind detection on the PSCCH to acquire position information about the PSCCH, the PSSCH and the HARQ-ACK feedback channel; a determination sub-module configured to, after the position information about the PSSCH has been acquired, parse the PSSCH to acquire a unicasting or multicasting transmission state, and determine the feedback information in accordance with the unicasting or multicasting transmission state; and a second transmission sub-module configured to transmit the feedback information to the source UE through the HARQ-ACK feedback channel.

In a unicasting communication mode, the SCI may include a target ID indicator and an offset indicator; or in the unicasting communication mode, the SCI may include the target ID indicator, and a source ID indicator or a session ID/sequence ID indicator, and the source ID and the target ID may be determined by the target UE and the source UE through negotiation or interaction in a connection establishment process; or in the unicasting communication mode, when the source ID, the target ID and an offset value are determined by the target UE and the source UE through negotiation or interaction in the connection establishment process, the SCI may include the target ID indicator, and the source ID or the session ID/sequence ID indicator.

The determination sub-module is further configured to generate a first sequence carrying ACK information in accordance with the SCI when the unicasting transmission has been performed successfully between the target UE and the source UE.

The determination sub-module is further configured to: when the SCI includes the source ID indicator, generate the first sequence in accordance with a system mapping and the source ID; or when the SCI includes the target ID indicator, generate the first sequence in accordance with the target ID and the offset value; or when the SCI includes the session ID/sequence ID indicator, generate the first sequence in accordance with the system mapping and a session ID/sequence ID.

The second transmission sub-module is further configured to transmit the first sequence carrying the ACK information to the source UE through the HARQ-ACK feedback channel, and the feedback information may be transmitted by the target UE in the unicasting communication mode merely when reception has been performed successfully.

The determination sub-module is further configured to, when the multicasting transmission has been performed unsuccessfully between the target UE and the source UE, generate a second sequence carrying NACK information in accordance with a target group ID, and the target group ID may be determined by at least two target UEs and the source UE through negotiation or interaction in a multicasting connection establishment process.

The determination sub-module is further configured to, when the multicasting transmission has been performed unsuccessfully between the target UE and the source UE, generate a third sequence carrying NACK information in accordance with the target group ID and corresponding identification information. The target group ID and the identification information about the source UE and the target UEs may be determined by the at least two target UEs and the source UE through negotiation or interaction in the connection establishment process, and different pieces of identification information about the target UEs may correspond to different offset values.

The second transmission sub-module is further configured to transmit the second sequence carrying the NACK information to the source UE through the HARQ-ACK feedback channel, and the feedback information may be transmitted by the target UE in the multicasting communication mode merely when reception has been performed unsuccessfully.

The second transmission sub-module is further configured to transmit the third sequence carrying the NACK information to the source UE through the HARQ-ACK feedback channel, and the feedback information may be transmitted by the target UE in the multicasting communication mode merely when the reception has been performed unsuccessfully.

After the second transmission module has transmitted the feedback information on the time-frequency transmission resource, when the unicasting or multicasting transmission is performed unsuccessfully between the source UE and the target UE, the target UE may further include a second processing module configured to determine that a retransmission process is to be initiated, and receive the reacquired time-frequency transmission resource from the source UE.

According to the target UE in the embodiments of the present disclosure, the time-frequency transmission resource for transmitting the feedback information for the unicasting or multicasting transmission may be received from the source UE, the feedback information may be transmitted on the time-frequency transmission resource, and the unicasting or multicasting transmission state may be transmitted to the source UE. As a result, the source UE may acquire transmission state information through the introduction of feedback resources, so as to facilitate the determination of the retransmission between the source UE and the target UE and ensure the communication therebetween.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A transmission feedback method, comprising:
   transmitting a time-frequency transmission resource for transmitting feedback information for unicasting or multicasting transmission to at least one target User Equipment (UE) which has established a connection with a source UE;
   acquiring the feedback information transmitted on the time-frequency transmission resource from the target UE; and
   determining a unicasting or multicasting transmission state in accordance with the feedback information;
   wherein the transmitting the time-frequency transmission resource for transmitting the feedback information for unicasting or multicasting transmission to the at least one target UE which has established the connection with the source UE comprises:
     establishing the connection with the at least one target UE; and
     autonomously selecting a time-frequency transmission resource or receiving a time-frequency transmission resource allocated by a network side device, and transmitting the time-frequency transmission resource to the target UE;
   wherein the establishing the connection with the at least one target UE comprises:
     in a multicasting communication mode, establishing, by the source UE, the connection with at least two target UEs; and
     in a connection establishment process, negotiating or interacting, by the source UE, with the at least two target UEs to determine a target group ID and identification information about the source UE and the at least two target UEs;
   wherein the acquiring the feedback information transmitted on the time-frequency transmission resource from the target UE comprises:
     acquiring a second sequence generated by the target UE in accordance with the target group ID; and
     performing sliding-related peak detection on the HARQ-ACK feedback channel for the time-frequency transmission resource in accordance with sequence correlation, and acquiring the feedback information;
   or,
   wherein the acquiring the feedback information transmitted on the time-frequency transmission resource from the target UE comprises:
     acquiring a third sequence generated by the at least one target UE in accordance with the target group ID and corresponding identification information; and
     performing sliding-related peak detection on the HARQ-ACK feedback channel for the time-frequency transmission resource in accordance with the sequence correlation, and when Negative Acknowledge (NACK) information has been detected in accordance with the third sequence, stopping the detection and acquiring the feedback information,
   wherein different pieces of identification information about the target UEs correspond to different offset values.

2. The transmission feedback method according to claim 1, wherein the time-frequency transmission resource at least comprises a Physical Sidelink Shared Channel (PSSCH), a Physical Sidelink Control Channel (PSCCH), and a Hybrid Automatic Repeat Request-Acknowledgement (HARQ-ACK) feedback channel, and Sidelink Control Information (SCI) is carried in the PSCCH and indicates position information about the HARQ-ACK feedback channel.

3. The feedback transmission method according to claim 1, wherein the establishing the connection with the at least one target UE comprises:
  in a unicasting communication mode, establishing, by the source UE, the connection with one target UE; and
  in a connection establishment process, negotiating or interacting, by the source UE, with the target UE to determine a source Identity (ID) and a target ID.

4. The transmission feedback method according to claim 3, wherein
  the SCI carried in the time-frequency transmission resource comprises a target ID indicator and an offset indicator; or
  the SCI comprises the target ID indicator, and a source ID indicator or a session ID/sequence ID indicator; or
  when the source UE has negotiated or interacted with the target UE in the connection establishment process to determine an offset value, the SCI comprises the target ID indicator, and the source ID indicator or the session ID/sequence ID indicator.

5. The transmission feedback method according to claim 4, wherein the acquiring the feedback information transmitted on the time-frequency transmission resource from the target UE comprises:
  acquiring a first sequence in accordance with the SCI; and
  performing sliding-related peak detection on the HARQ-ACK feedback channel for the time-frequency transmission resource in accordance with sequence correlation, and acquiring the feedback information.

6. The transmission feedback method according to claim 5, wherein the acquiring the first sequence in accordance with the SCI comprises:
  when the SCI comprises the source ID indicator, acquiring the first sequence generated by the target UE in accordance with a system mapping and the source ID; or
  when the SCI comprises the target ID indicator, acquiring the first sequence generated by the target UE in accordance with the target ID and an offset value, the offset value being indicated in the SCI or determined by the source UE and the target UE through negotiation or interaction in the connection establishment process; or
  when the SCI comprises the session ID/sequence ID indicator, acquiring the first sequence generated by the target UE in accordance with the system mapping and a session ID/sequence ID.

7. The transmission feedback method according to claim 1, wherein the autonomously selecting a time-frequency transmission resource or receiving a time-frequency transmission resource allocated by the network side device and transmitting the time-frequency transmission resource to the target UE comprises:
  autonomously selecting, by the source UE, a time-frequency transmission resource from a resource pool, and transmitting the selected time-frequency transmission resource to the target UE; or
  after the network side device has allocated a time-frequency transmission resource in accordance with a service delay requirement of the source UE and a processing capability of the target UE, receiving the time-frequency transmission resource from the network side device and transmitting the time-frequency transmission resource to the target UE.

8. The transmission feedback method according to claim 1, wherein the determining the unicasting or multicasting transmission state in accordance with the feedback information comprises:
  upon the receipt of ACK information from the target UE, determining that the unicasting transmission has been performed successfully between the source UE and the target UE; and
  upon the receipt of the NACK information from the target UE, determining that the multicasting transmission has been performed unsuccessfully between the source UE and the target UE,
  wherein the feedback information is transmitted by the target UE in the unicasting communication mode merely when reception has been performed successfully, and the feedback information is transmitted by the target UE in the multicasting communication mode merely when the reception has been performed unsuccessfully.

9. The transmission feedback method according to claim 1, wherein when the unicasting or multicasting transmission has been performed unsuccessfully between the source UE and the target UE, the transmission feedback method further comprises:
  initiating a retransmission process, and transmitting the reacquired time-frequency transmission resource to the target UE.

10. A transmission feedback method, comprising:
  receiving a time-frequency transmission resource for transmitting feedback information for unicasting or multicasting transmission from a source User Equipment (UE); and
  transmitting, by a target UE, the feedback information on the time-frequency transmission resource;
  wherein the time-frequency transmission resource at least comprises a Physical Sidelink Shared Channel (PSSCH), a Physical Sidelink Control Channel (PSCCH), and a Hybrid Automatic Repeat Request-Acknowledgement (HARQ-ACK) feedback channel, and Sidelink Control Information (SCI) is carried in the PSCCH and indicates position information about the HARQ-ACK feedback channel;
  wherein the transmitting, by the target UE, the feedback information on the time-frequency transmission resource comprises:
    performing blind detection on the PSCCH to acquire position information about the PSCCH, the PSSCH and the HARQ-ACK feedback channel;
    after the position information about the PSSCH has been acquired, parsing the PSSCH to acquire a unicasting or multicasting transmission state, and determining the feedback information in accordance with the unicasting or multicasting transmission state; and
    transmitting the feedback information to the source UE through the HARQ-ACK feedback channel;
  wherein the determining the feedback information in accordance with the unicasting or multicasting transmission state comprises:
    when the multicasting transmission has been performed unsuccessfully between the target UE and the source UE, generating, by the target UE which has performed reception unsuccessfully, a second sequence carrying Negative Acknowledgement (NACK) information in accordance with a target group ID, wherein the target group ID is determined by at least two target UEs and the source UE through negotiation or interaction in a multicasting connection establishment process;
or,
wherein the determining the feedback information in accordance with the unicasting or multicasting transmission state comprises:
when the multicasting transmission has been performed unsuccessfully between the target UE and the source UE, generating, by the target UE which has performed the reception unsuccessfully, a third sequence carrying NACK information in accordance with the target group ID and corresponding identification information,
wherein the target group ID and the identification information about the source UE and the target UEs are determined by the at least two target UEs and the source UE through negotiation or interaction in the connection establishment process, and different pieces of identification information about the target UEs correspond to different offset values.

11. The transmission feedback method according to claim 10, wherein the receiving the time-frequency transmission resource for transmitting the feedback information for the unicasting or multicasting transmission from the source UE comprises:
establishing a connection with the source UE; and
receiving the time-frequency transmission resource from the source UE.

12. The transmission feedback method according to claim 10, wherein
in a unicasting communication mode, the SCI comprises a target Identity (ID) indicator and an offset indicator; or
in the unicasting communication mode, the SCI comprises the target ID indicator, and a source ID indicator or a session ID/sequence ID indicator, and the source ID and the target ID are determined by the target UE and the source UE through negotiation or interaction in a connection establishment process; or
in the unicasting communication mode, when the source ID, the target ID and an offset value are determined by the target UE and the source UE through negotiation or interaction in the connection establishment process, the SCI comprises the target ID indicator, and the source ID indicator or the session ID/sequence ID indicator.

13. A target User Equipment (UE), comprising a transceiver, a memory, a processor, and a computer program stored in the memory and executed by the processor, wherein the transceiver is configured to execute the computer program, so as to implement the transmission feedback method according to claim 10.

14. A source User Equipment (UE), comprising a transceiver, a memory, a processor, and a computer program stored in the memory and executed by the processor, wherein the transceiver is configured to execute the computer program, so as to transmit a time-frequency transmission resource for transmitting feedback information for unicasting or multicasting transmission to at least one target UE which has established a connection with the source UE, wherein the processor is configured to: acquire the feedback information transmitted on the time-frequency transmission resource from the target UE; and determine a unicasting or multicasting transmission state in accordance with the feedback information;

wherein when transmitting the time-frequency transmission resource for transmitting the feedback information for unicasting or multicasting transmission to the at least one target UE which has established the connection with the source UE, the transceiver is further configured to:
establish the connection with the at least one target UE; and
autonomously select a time-frequency transmission resource or receive a time-frequency transmission resource allocated by a network side device, and transmit the time-frequency transmission resource to the target UE;
wherein when establishing the connection with the at least one target UE, the transceiver is further configured to:
in a multicasting communication mode, establish the connection with at least two target UEs; and
in a connection establishment process, negotiate or interact with the at least two target UEs to determine a target group ID and identification information about the source UE and the at least two target UEs;
wherein when acquiring the feedback information transmitted on the time-frequency transmission resource from the target UE, the processor is further configured to:
acquire a second sequence generated by the target UE in accordance with the target group ID; and
perform sliding-related peak detection on the HARQ-ACK feedback channel for the time-frequency transmission resource in accordance with sequence correlation, and acquire the feedback information;
or,
wherein when acquiring the feedback information transmitted on the time-frequency transmission resource from the target UE, the processor is further configured to:
acquire a third sequence generated by the at least one target UE in accordance with the target group ID and corresponding identification information; and
perform sliding-related peak detection on the HARQ-ACK feedback channel for the time-frequency transmission resource in accordance with the sequence correlation, and when NACK information has been detected in accordance with the third sequence, stop the detection and acquire the feedback information,
wherein different pieces of identification information about the target UEs correspond to different offset values.

15. The source UE according to claim 14, wherein the time-frequency transmission resource at least comprises a Physical Sidelink Shared Channel (PSSCH), a Physical Sidelink Control Channel (PSCCH), and a Hybrid Automatic Repeat Request-Acknowledgement (HARQ-ACK) feedback channel, and Sidelink Control Information (SCI) is carried in the PSCCH and indicates position information about the HARQ-ACK feedback channel.

16. The source UE according to claim 14, wherein when establishing the connection with the at least one target UE, the transceiver is further configured to:
in a unicasting communication mode, establish the connection with one target UE; and
in a connection establishment process, negotiate or interact with the target UE to determine a source Identity (ID) and a target ID.

17. The source UE according to claim 16, wherein
the SCI carried in the time-frequency transmission resource comprises a target ID indicator and an offset indicator; or
the SCI comprises the target ID indicator, and a source ID indicator or a session ID/sequence ID indicator; or
when the source UE has negotiated or interacted with the target UE in the connection establishment process to determine an offset value, the SCI comprises the target ID indicator, and the source ID indicator or the session ID/sequence ID indicator.

18. The source UE according to claim 17, wherein when acquiring the feedback information transmitted on the time-frequency transmission resource from the target UE, the processor is further configured to:
acquire a first sequence in accordance with the SCI; and
perform sliding-related peak detection on the HARQ-ACK feedback channel for the time-frequency transmission resource in accordance with sequence correlation, and acquire the feedback information.

19. The source UE according to claim 18, wherein when acquiring the first sequence in accordance with the SCI, the processor is further configured to:
when the SCI comprises the source ID indicator, acquire the first sequence generated by the target UE in accordance with a system mapping and the source ID; or
when the SCI comprises the target ID indicator, acquire the first sequence generated by the target UE in accordance with the target ID and an offset value, the offset value being indicated in the SCI or determined by the source UE and the target UE through negotiation or interaction in the connection establishment process; or
when the SCI comprises the session ID/sequence ID indicator, acquire the first sequence generated by the target UE in accordance with the system mapping and a session ID/sequence ID.

20. The source UE according to claim 14, wherein when autonomously selecting the time-frequency transmission resource or receiving the time-frequency transmission resource allocated by the network side device and transmitting the time-frequency transmission resource to the target UE, the transceiver is further configured to:
autonomously select a time-frequency transmission resource from a resource pool, and transmit the selected time-frequency transmission resource to the target UE; or
after the network side device has allocated a time-frequency transmission resource in accordance with a service delay requirement of the source UE and a processing capability of the target UE, receive the time-frequency transmission resource from the network side device and transmit the time-frequency transmission resource to the target UE.

* * * * *